United States Patent
Tanriover et al.

(10) Patent No.: US 10,747,007 B2
(45) Date of Patent: Aug. 18, 2020

(54) INTELLIGENT VEHICLE POINT OF FOCUS COMMUNICATION

(71) Applicant: Intel Corporation, Santa Clara, CA (US)

(72) Inventors: Cagri Tanriover, Bethany, OR (US); Richard Beckwith, Hillsboro, OR (US); Asli Arslan Esme, Istanbul (TR); John Sherry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 35 days.

(21) Appl. No.: 16/145,189

(22) Filed: Sep. 28, 2018

(65) Prior Publication Data
US 2019/0049736 A1 Feb. 14, 2019

(51) Int. Cl.
*G02B 27/01* (2006.01)
*G06F 3/01* (2006.01)
*G06K 9/00* (2006.01)
*B60K 35/00* (2006.01)

(52) U.S. Cl.
CPC .......... *G02B 27/0179* (2013.01); *B60K 35/00* (2013.01); *G06F 3/013* (2013.01); *G06K 9/00845* (2013.01); *B60K 2370/149* (2019.05); *B60K 2370/152* (2019.05); *B60K 2370/182* (2019.05); *B60K 2370/334* (2019.05); *G02B 2027/0187* (2013.01)

(58) Field of Classification Search
CPC ..... G02B 27/0179; G06F 3/013; B60W 50/14
See application file for complete search history.

(56) References Cited

U.S. PATENT DOCUMENTS

2018/0222490 A1* 8/2018 Ishihara ................ B60W 50/14

OTHER PUBLICATIONS

YouTube video "Toyota Concept-i | Concept Movie", https://www.youtube.com/watch?v=8lyPVK31j2o, published on Mar. 13, 2017.
YouTube video "Meet the Cruise AV Self-Driving Car", https://www.youtube.com/watch?v=MvP82IsGqNc&feature=youtu.be, published on Jan. 11, 2018.
YouTube video "Here's why 2018 Mercedes S Class is the Best Luxury car in the world!", https://www.youtube.com/watch?v=Qd_Y_r2-R1M, published on Jul. 20, 2017.

(Continued)

*Primary Examiner* — Kevin M Nguyen
(74) *Attorney, Agent, or Firm* — Viering, Jentschura & Partner mbB

(57) ABSTRACT

Herein is disclosed a virtual embodiment display system comprising one or more image sensors, configured to receive one or more images of a vehicle occupant; one or more processors, configured to determine a gaze direction of the vehicle occupant from the one or more images; select a display location corresponding to the determined gaze direction; and control an image display device to display a virtual embodiment of an intelligent agent at the display location; the image display device, configured to display the virtual embodiment of the intelligent agent at the selected display location according to the one or more processors.

20 Claims, 13 Drawing Sheets

(56) References Cited

OTHER PUBLICATIONS

YouTube video "BMW Self Driving Car Demonstration BMW i8 Roadster 2018 BMW Autonomous Connected Car CARJAM TV HD", https://www.youtube.com/watch?v=0qCqt8jLPaE, published on Jul. 6, 2017.

YouTube video "My First Autonomous Driving Experience with Jack the Audi A7", https://www.youtube.com/watch?v=GYXgb7Ctk0l, published on Jan. 13, 2017.

\* cited by examiner

US 10,747,007 B2

INTELLIGENT VEHICLE POINT OF FOCUS COMMUNICATION

TECHNICAL FIELD

Various aspects of the disclosure relate generally to the use of an intelligent agent for interaction between artificial intelligence and humans.

BACKGROUND

As vehicles assume functions that had previously been reserved for drivers, thereby becoming autonomous or semi-autonomous vehicles, communication between vehicle occupant and vehicle assumes greater importance. Existing models for such communication tends to reflect a desire for the vehicle to provide a variety of information to the driver as well as the passengers, such as in the context of one or more displays, which may display data related to the vehicle's autonomous or semi-autonomous actions. Occupants may similarly provide information to the vehicle through one or more controls (buttons and the like) or by inputting information on a screen. In addition, speech recognition abilities have permitted at least some level of voice-based communication between humans and machines. Whether screen-based or speech-based, natural and fluent communication requires a point of focus for communication between the occupant and the vehicle, and the lack of a point of focus is detrimental to communication.

SUMMARY

Herein is disclosed a virtual embodiment display system including one or more image sensors, configured to receive one or more images of a vehicle occupant; one or more processors, configured to determine a gaze direction of the vehicle occupant from the one or more images; select a display location corresponding to the determined gaze direction; and control an image display device to display a tag at the display location; the image display device, configured to display the tag at the selected display location according to the one or more processors.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
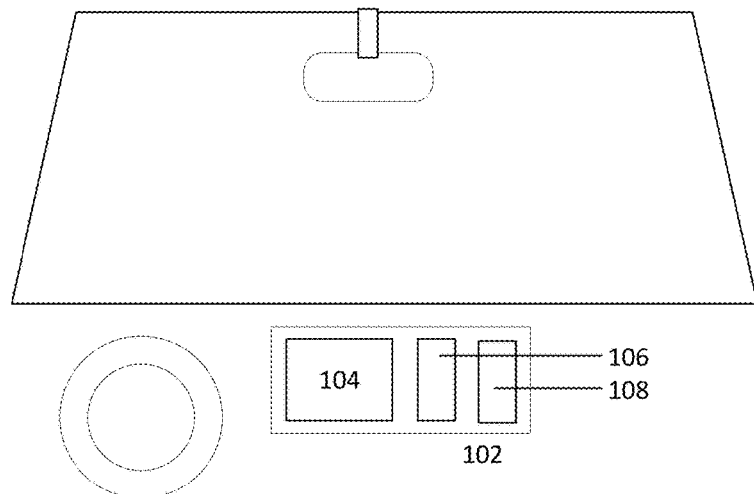
FIG. 1 depicts a conventional occupant-vehicle interface.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Neuromorphic Computer Unit (NCU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Neuromorphic Computer Unit (NCU), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "tag" as used herein to indicate an identifier of the artificial intelligence. The tag may take any form whatsoever. According to one aspect of the disclosure, the tag may have a human or near-human form. According to another aspect of the disclosure, the tag may have a representative form, such as, but not limited to, a cartoon, a drawing, a comic, an avatar, or other figure. According to another aspect of the disclosure, the tag may have an abstract form, such as one or more geometric shapes, a design, a logo, or otherwise. The tag may be a virtual embodiment of the intelligent agent.

Current research efforts and industry trends focus on positioning the autonomous vehicle as a trusted social companion, suggesting an effort to help humans perceive intelligent vehicles as representations of a sentient being. This requires establishing a natural means of communication between humans and autonomous vehicle. Without first establishing a natural means of communication between humans and autonomous vehicles, the perception of the vehicle as a representation of a being is unlikely to be achieved. One meaningful component of this communication is a dialogue management system within the autonomous vehicle. An additional meaningful component is a representation within the autonomous vehicle of the vehicle intelligence, thus providing a central point of focus for one or more human occupants to communicate and interact with the autonomous vehicle. It may be further necessary to create the representation in a configurable way, such that adaptation can be performed as research develops, and to apply to a variety of vehicle configurations and autonomous vehicle interior designs.

As autonomous vehicles are developed, it has been known to create a point of interaction between a vehicle occupant and the autonomous vehicle in the form of a screen, said screen typically providing unidirectional information to the occupant regarding the vehicle's intentions or actions. Various autonomous vehicle implementations have arranged said information in a single screen, or possibly throughout multiple screens within the vehicle. Said screen or screens may provide information such as, for example, vehicle speed, vehicle surroundings, and any vehicle maneuvers performed by the autonomous vehicle. Such screen interfaces have been used in performance and/or tests of a variety of autonomous vehicle levels, including Level 3, Level 4, and Level 5 driving. Although providing information in this manner to the occupant may have some utility, it does not approximate human to human interaction. As such, effective communication may require several additional translational steps, or information may be lost altogether.

Currently used autonomous vehicles may lack a point of focus within the autonomous vehicle for interaction between one or more occupants and the intelligent agent of the autonomous vehicle. Conventionally used communication interfaces, such as screens delivering data, may not be suitable for an occupant to make natural eye contact while communicating with the autonomous vehicle, if they lack an embodiment of the intelligent agent of the autonomous vehicle. Furthermore, unless a passenger believes that the conventionally used communication device has the ability to see and understand paralinguistic features of language, the passenger will be less likely to use these features which, if used by the passenger, could facilitate communication between the passenger and the vehicle intelligence. Aspects of this disclosure include virtual and/or physical embodiments of the intelligent agent that serve as a point of focus system for occupants within the autonomous vehicle, as well as system components that are designed to capture and utilize occupant movements and/or interactions with these embodiments in various configurations. These may result in a more natural manner of interacting with the intelligent agent of the autonomous vehicle and render autonomous vehicle technology closer to becoming a trusted companion for human beings.

As autonomous vehicle technology is improved, it is anticipated that autonomous vehicles will perform with Level 4 and Level 5 capability, for which improved communication between occupant and autonomous vehicle may be beneficial. In addition, in-cabin experiences for vehicle occupants may become key differentiators for fleet services that will be offered by various vehicles. Increased occupant satisfaction, as well as increased or improved occupant-to-autonomous vehicle communication may be reached by improving communication interfaces to approximate a natural human-to-human communication. Furthermore, by providing occupants with a point of focus, the gaze of the occupants may be constrained in order to improve sensing accuracy of in-cabin human understanding scenarios. Such scenarios may be occasions of human movement or human gaze behavior, for which the autonomous vehicle may perform a behavioral analysis in order to gain an understanding of the human occupant's instructions, impressions or desires. Such behavioral analysis may be more successful where the occupant's gaze is generated with a particular perspective in mind, rather than when the occupant's gaze has no specific point of focus. The principles described herein may permit a vehicle occupant to achieve a higher level of integration with, and control of, the autonomous vehicle system.

FIG. 1 depicts a known vehicle information system 100, as viewed from within an interior of the vehicle. A vehicle with some level of autonomous vehicle capability may include a communication interface 102, on which information is provided to a vehicle occupant. The communication interface 102 may be subdivided into a number of interfaces with one or more dedicated functions, such as depicted in 104, 106, and 108. Under this configuration, and occupant within the vehicle turns to the communication interface 102 to obtain information about the vehicle and/or any autonomous vehicle functions or capabilities. Information provided to the vehicle may be provided via the communication interface 102.

Figure 2:
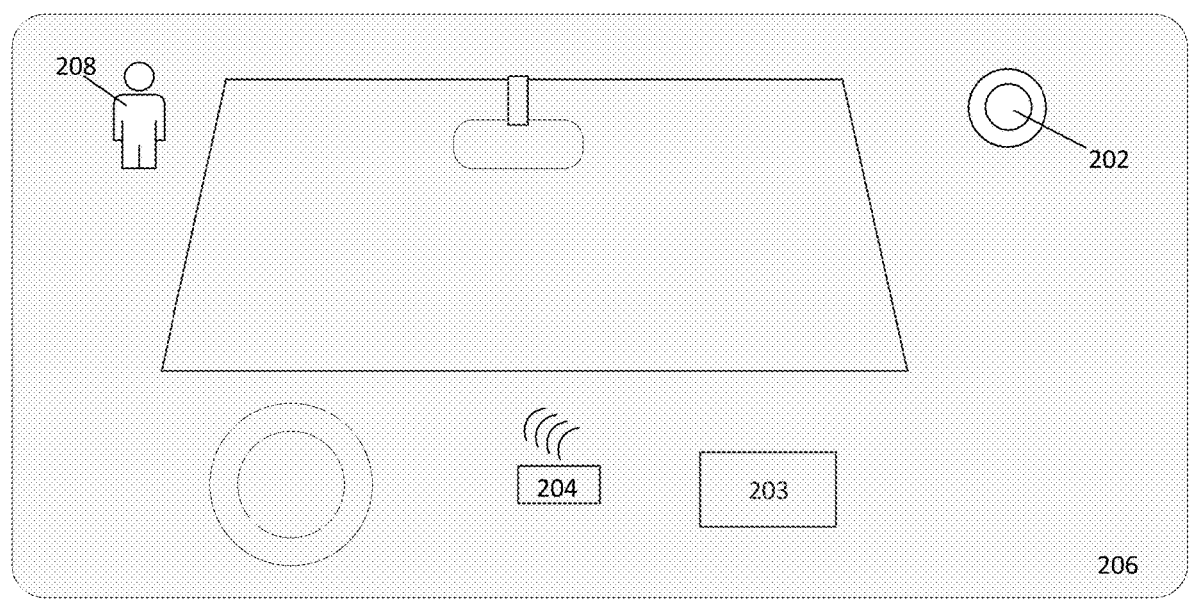
FIG. 2 depicts an occupant-vehicle interface according to a first aspect of the disclosure.

FIG. 2 depicts a vehicle visual tag system according to a first aspect of the disclosure. The vehicle is equipped with one or more image sensors 202, which are configured to receive images of a vehicle occupant. The vehicle may be equipped with one or more processors 203, which are configured to receive image data corresponding to the one or more images from the image sensor 202, and to determine from the image data a gaze direction of a vehicle occupant. As will be described in greater detail, the gaze direction may be calculated based on at least one of a calculation of occupant body position, head position, and eye position. The one or more processors 203 may be further configured to select a display location corresponding to the determined gaze direction of the vehicle occupant. The one or more processors 203 may be further configured to control an image display device to display a visual tag at the selected display location. The vehicle may further include an image display device 204, which is configured to display the visual tag at the selected display location according to the one or more processors. The visual display device 204 may be any device that is capable of displaying a visual tag. The visual display device 204 may include one or more projectors to project a visual tag on a surface of or within the vehicle. The visual display device 204 may include one or more screens, configured to display the visual tag at the selected location. In this case, the image sensor 202 receives images indicating that the occupant's gaze is directed to a top left area of the vehicle interior. The one or more processors 203 calculate the gaze based on the image data, using at least one of occupant body position, occupant head position, and occupant eye position. Upon determining a direction of gaze, the one or more processors map the gaze to an interior point or region of the vehicle and control the image display device 204 to project a visual tag 208 at the mapped region. In this case, the visual tag 208 is depicted as a human shape. The visual tag may be of any design whatsoever. According to an aspect of the disclosure, the visual tag may be given a human or human-similar shape, which may engender feelings of trust or relatability within a human occupant. The visual tag may be given a shape including a face, such as with two eyes and the mouth, such that the eyes may be directed to appear to look at one or more regions of the vehicle, or to make eye contact with the vehicle occupant.

Figure 3:
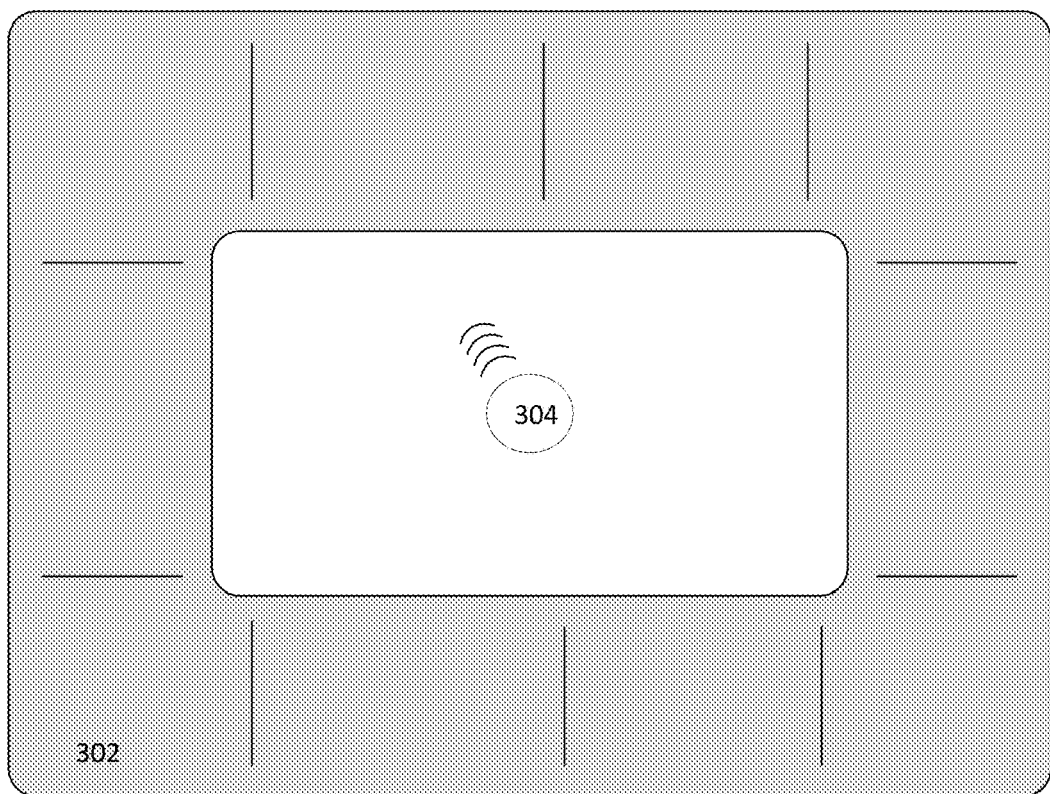
FIG. 3 depicts an occupant-vehicle interface according to a second aspect of the disclosure.

FIG. 3 depicts a vehicle visual tag system according to a second aspect of the disclosure. As autonomous vehicles develop, and as the need for at least intermittent human control of the vehicle diminishes, autonomous vehicle occupants may conceivably relinquish all traditional driving responsibilities, such as acceleration and steering. Accordingly, it is anticipated that some or all occupants may sit in a configuration other than the traditional forward-facing vehicle configuration. FIG. 3 depicts an alternative seating arrangement, wherein one or more occupants may sit in a round 302. In this case, the necessity to direct attention in the direction of travel may be diminished, which may permit introduction of one or more occupant focal areas 304 within the vehicle. In this case, focal area 304 may be an image display device, such that the visual tag may be projected from the focal area 304 to a desired location within the vehicle. The focal area 304 may be a physical embodiment of a visual tag, such as an embodied agent.

Figure 4:
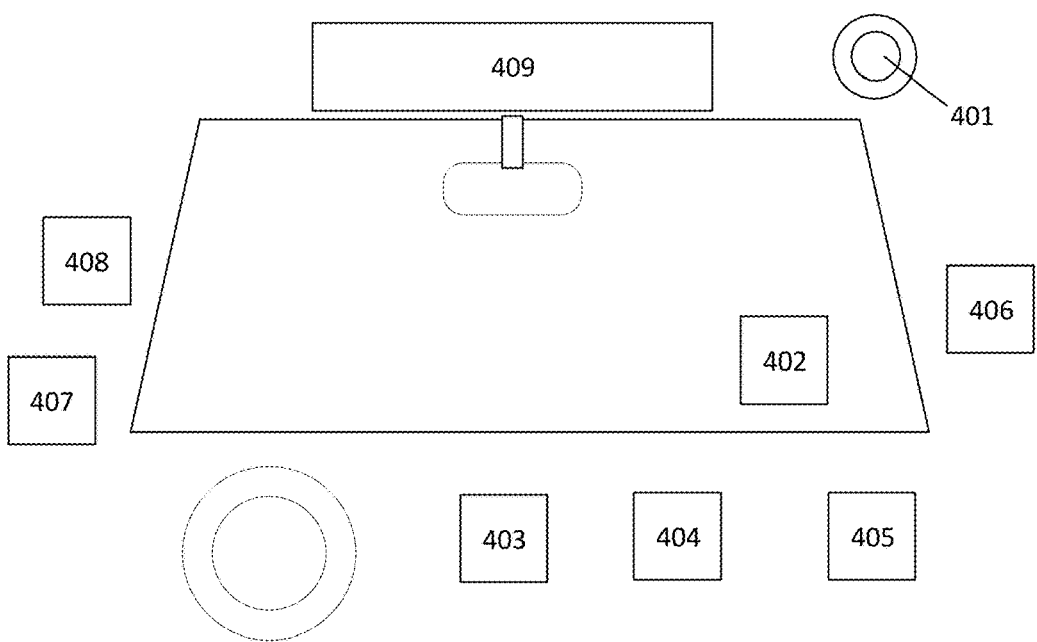
FIG. 4 depicts an occupant-vehicle interface according to a third aspect of the disclosure.

FIG. 4 depicts a vehicle visual tag system according to a third aspect of the disclosure. The vehicle may be equipped with one or more image sensors 401, which are configured to obtain one or more images of a user occupant. One or more processors 402 within the vehicle may be configured to receive the images from the one or more image sensors 401 and to determine from the received images an occupant gaze. Based on the occupant gaze, the one or more processors may select a display location corresponding to the determined gaze location of the vehicle occupant. The vehicle may be equipped with a plurality of image display devices, which are configured as one or more screens 403-409. The one or more processors may be configured to select a screen corresponding to the determined gaze location, and to control the selected screen to display the visual tag. That is, rather than projecting the visual tag on a predetermined location, the one or more processors may select a screen at or within a vicinity of the desired location, and to cause the selected screen to display the visual tag.

Figure 5:
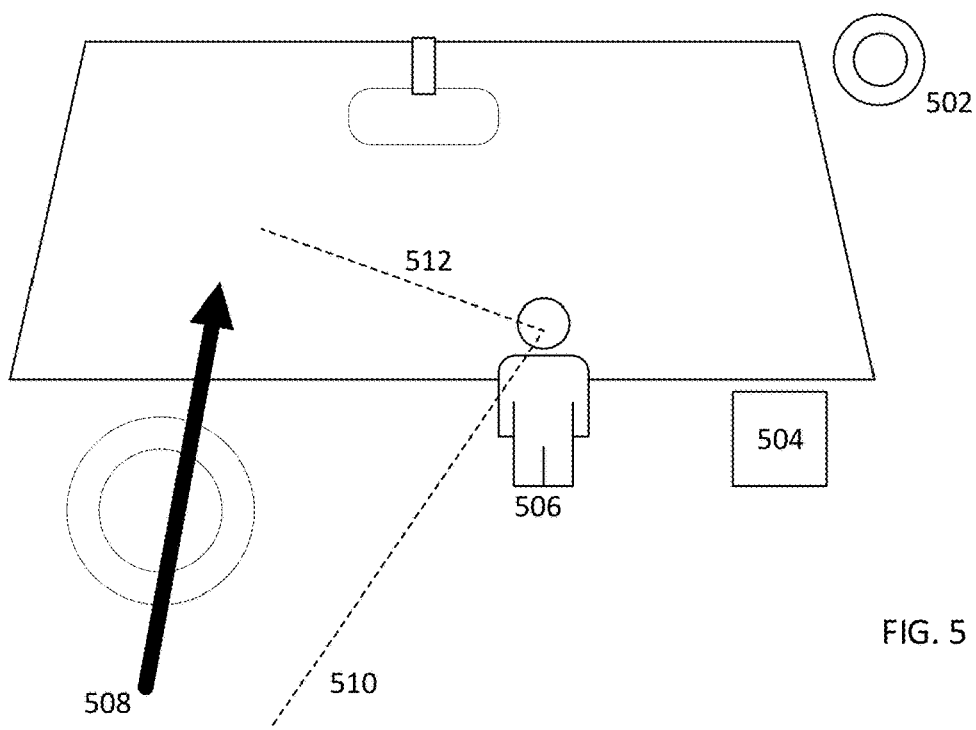
FIG. 5 depicts a vehicle visual tag system according to a fourth aspect of the disclosure.

FIG. 5 depicts a vehicle visual tag system according to a fourth aspect of the disclosure. In this case, the vehicle is equipped with one or more image sensors 502, which are configured to obtain images of a vehicle occupant. The system further includes one or more processors 504, which are configured to determine an occupant gaze from the one or more images. In this case, rather than projecting or displaying an image of a visual tag, the vehicle may include a physical embodied agent 506, which may be, for example, a three-dimensional representation of a visual tag. According to one aspect of the disclosure, the physical embodied agent 506 may resemble a human shape. The physical embodied agent may include at least one of a head, a torso, upper extremities, lower extremities, or any combination thereof. The physical embodied agent 506 may be located anywhere within the motor vehicle. The physical embodied agent 506 may be designed as a focal point for paralinguistic gaze of one or more occupants, such that an occupant's gaze is directed to, or conditioned by, the physical embodied agent 506 during communication.

An occupant may directly gaze in a direction other than the physical embodied agent 506, such as to an area of the vehicle, or to an area outside of the vehicle. Element 508 depicts a gaze of an occupant being directed to a region outside of the vehicle. The physical embodied agent 506 is within a line of sight 510 of the occupant, or the occupant otherwise expresses a belief that the agent to have access to the direction of gaze. The physical embodied agent may be configured to receive images corresponding to a vicinity of the vehicle 512 and to correlate the occupant gaze 508 with an object in the vicinity of the vehicle 512. Accordingly, the physical embodied agent 506 may be equipped to recognize an occupant's point of focus outside of the vehicle. The physical embodied agent 506 may be equipped with one or more image sensors on or within the physical embodied agent, or the physical embodied agent may receive information or data from one or more image sensors external to the physical embodied agent. Similarly, any processing necessary for the physical embodied agent may be performed by one or more processors located within or external to the physical embodied agent.

Figure 6:
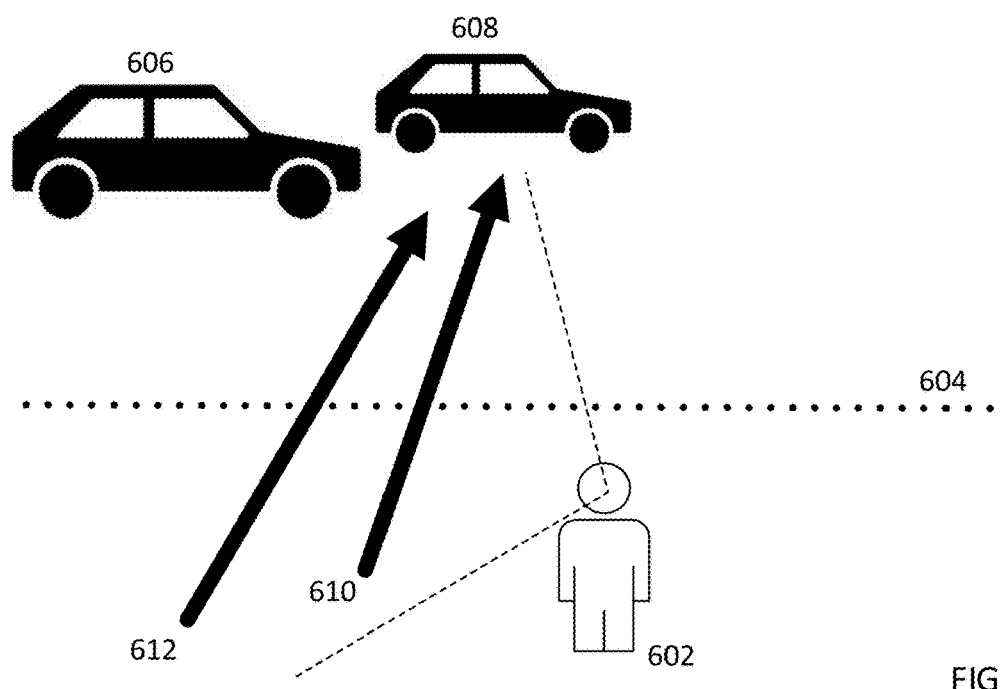
FIG. 6 depicts a physical embodied agent's correlation of an occupant gaze with an occupant gesture.

FIG. 6 depicts a physical embodied agent's correlation of an occupant's gaze with an occupant's gesture. In situations where the physical embodied agent may recognize a gaze of a vehicle occupant, the determined gaze may be associated with a direction or a vector, which may be extended from the occupant in a specified direction, to provide information about an object or point of focus of the occupant. Without further information, however, it may be difficult or impossible to discern the specific object of focus of the occupant, as the object may theoretically be any object along a vector or line extending outward from the occupant. Additional information about an occupant's attention or visual focus may be derived from an occupant's gesture. Disambiguation may be multimodal; for example, language, gesture, posture, and/or gaze may all work together to help a machine intelligence to understand how to ground a passenger's reference. In FIG. 6, an occupant's gesture 610, such as, but not limited to, an extended arm pointing in a direction, is depicted along with a determined gaze 612. Two vehicles 606 and 608 are depicted as being outside of the occupants of vehicle, as indicated by a line of demarcation 604 differentiating between a region inside the vehicle and a region outside of the vehicle. It is anticipated that a human occupant may instruct the autonomous vehicle to perform an activity, such that the instruction may be ambiguous. For demonstrative purposes, a specific example may be an occupant instructing an autonomous vehicle in a vicinity of two vehicles 606 and 608 to park "next to the car." A verbal cue alone (such as a verbal instruction to park "next to the car") may provide insufficient information for the autonomous vehicle, as multiple cars may be present, and therefore it cannot be determined which car is meant by the occupant. The ability to receive and understand a visual cue alongside a verbal cue, however, may allow the intelligent agent to much more accurately understand the occupant's intentions or instructions. For example, the occupant's gaze (a visual cue) may provide additional clues as to the object of the occupant's attention. In this case, the physical embodied agent 602 may detect a first vector 612 associated with an occupant's gaze and a second vector 610 associated with an occupant's gesture. The two vectors may be evaluated for a point of intersection, which may indicate an area of the occupant's attention. This is not limited to objects or regions outside of the vehicle but may also include objects or regions within the vehicle as well. That is, the occupant point or direct attention to one or more objects or regions within the vehicle, and the intelligent agent may be configured to identify from the occupant's gestures and/or gaze the object or area to which the occupant's attention is directed. Moreover, the detection of an occupant's gaze pay permit the embodied agent to engage in shared focus with the occupant as a communicative device.

Figure 7:
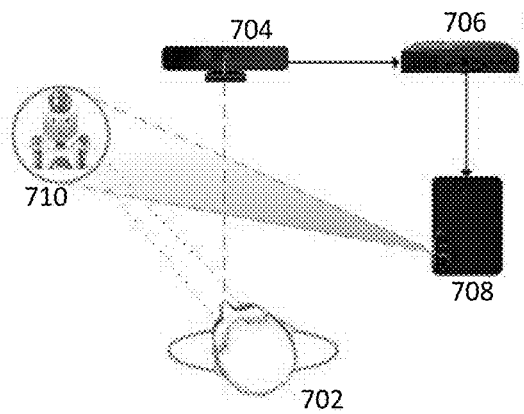
FIG. 7 depicts an additional configuration of the first aspect of the disclosure.

FIG. 7 depicts an additional configuration of the first aspect of the disclosure. In this case, the vehicle occupant 702 is present with attention drawn to a region of the vehicle. One or more image sensors 704 receive images of the vehicle occupant 702. The images are transferred to one or more processors 706, which determine from the images the occupant's gaze. The one or more processors 706 map the occupant's gaze to an area or point of the vehicle and control a projector 708 to project a visual tag 710 on the area corresponding with the occupant's gaze. By projecting on that area, it becomes unnecessary for the vehicle occupant to turn the occupant's gaze elsewhere to communicate with the autonomous vehicle while having a vehicle focal point.

Figure 8:
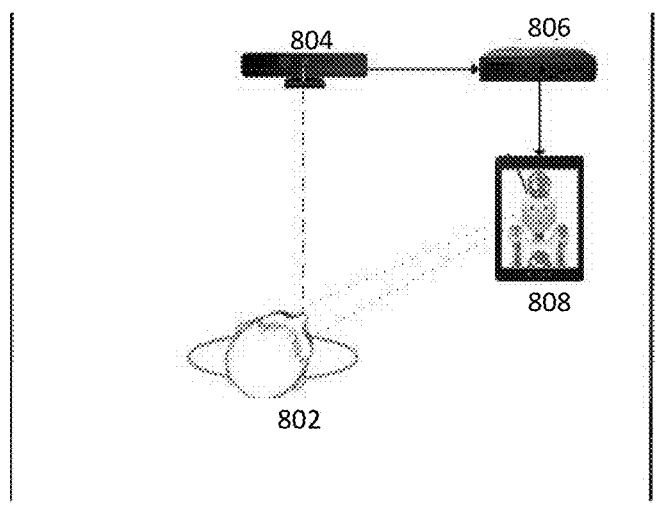
FIG. 8 depicts an additional configuration of the second aspect of the disclosure.

FIG. 8 depicts an additional configuration of the second aspect of the disclosure. In this case, a vehicle occupant 802 is within a vehicle while turning the occupant's gaze toward a focal point. The one or more image sensors 804 receive images of the vehicle occupant 802 and transfer the images to the one or more processors 806. The one or more processors 806 derive from the image data the occupant's gaze, which is mapped to a point or area of the vehicle. A screen or display corresponding to the mapped point or area is selected as a screen or display on which the visual tag is to be displayed. The one or more processors 806 control the selected display 808 to display the visual tag. The vehicle may be equipped with one or more displays, which may be located anywhere throughout the vehicle the displays may be multiple distinct displays; portions of one or more displays; flat displays; curved displays; bendable displays; or otherwise.

Figure 9:
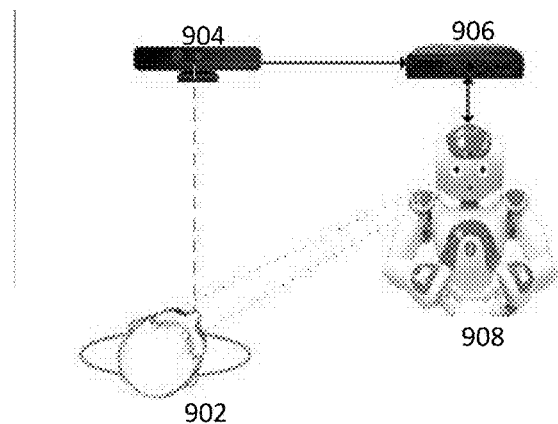
FIG. 9 depicts an additional configuration of the third aspect of the disclosure.

FIG. 9 depicts an additional configuration of the third aspect of the disclosure. The vehicle occupant 902 is within a vehicle while turning the occupant's gaze toward a focal point. In this case, the focal point is the physical embodied object. The one or more image sensors 904 are configured to receive images of the vehicle occupant 902 and to transfer said images or corresponding image data to one or more processors 906. The one or more processors 906 determine from the images or image data a user occupant's gaze. The one or more processors may control the physical embodied object 908 to perform one or more actions corresponding to the determined gaze of the occupant. For example, the one or more processors 906 may control the physical embodied object 908 to turn its torso, head, or otherwise toward the occupant or gesture to the occupant.

Figure 10:
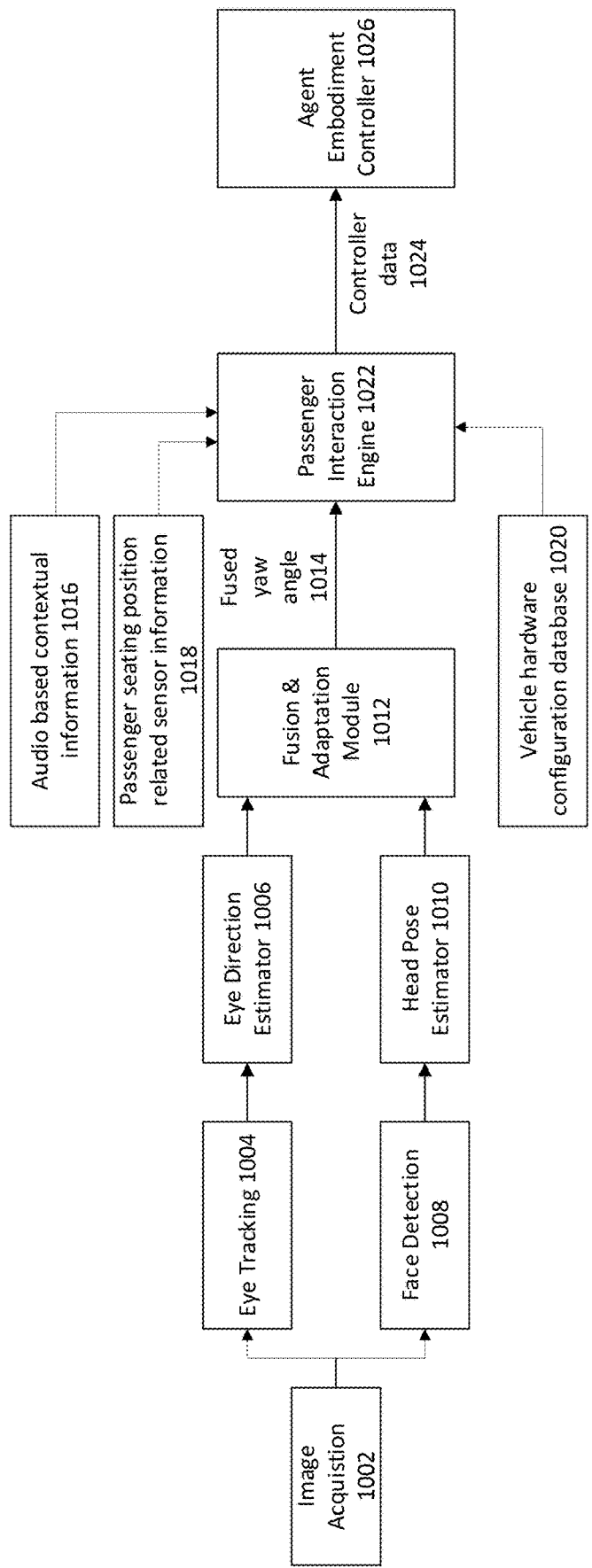
FIG. 10 depicts a processing workflow.

FIG. 10 depicts a processing workflow. One or more cameras are configured to perform image acquisition 1002, and the corresponding images or image data are transferred along two paths. The first path leads to eye tracking determination 1004, at which the occupant's eyes may be detected within the image data. The eye tracking information is evaluated by an eye direction estimator 1006, which determines a direction of the occupant's eyes. Regarding the second path, the image acquisition information is delivered to a face detection unit 1008, which isolates the occupant's face within the images or image data. The isolated face information is delivered to a head pose estimator 1010, which determines a head pose configuration relative to a reference point within the system or vehicle, or other head directional information relative to a fixed point. The eye direction estimation and head pose estimation information are delivered to the fusion and adaptation module ("FAM") 1012, which synthesizes the eye direction information and head pose information to determine an occupant gaze.

Figure 11:
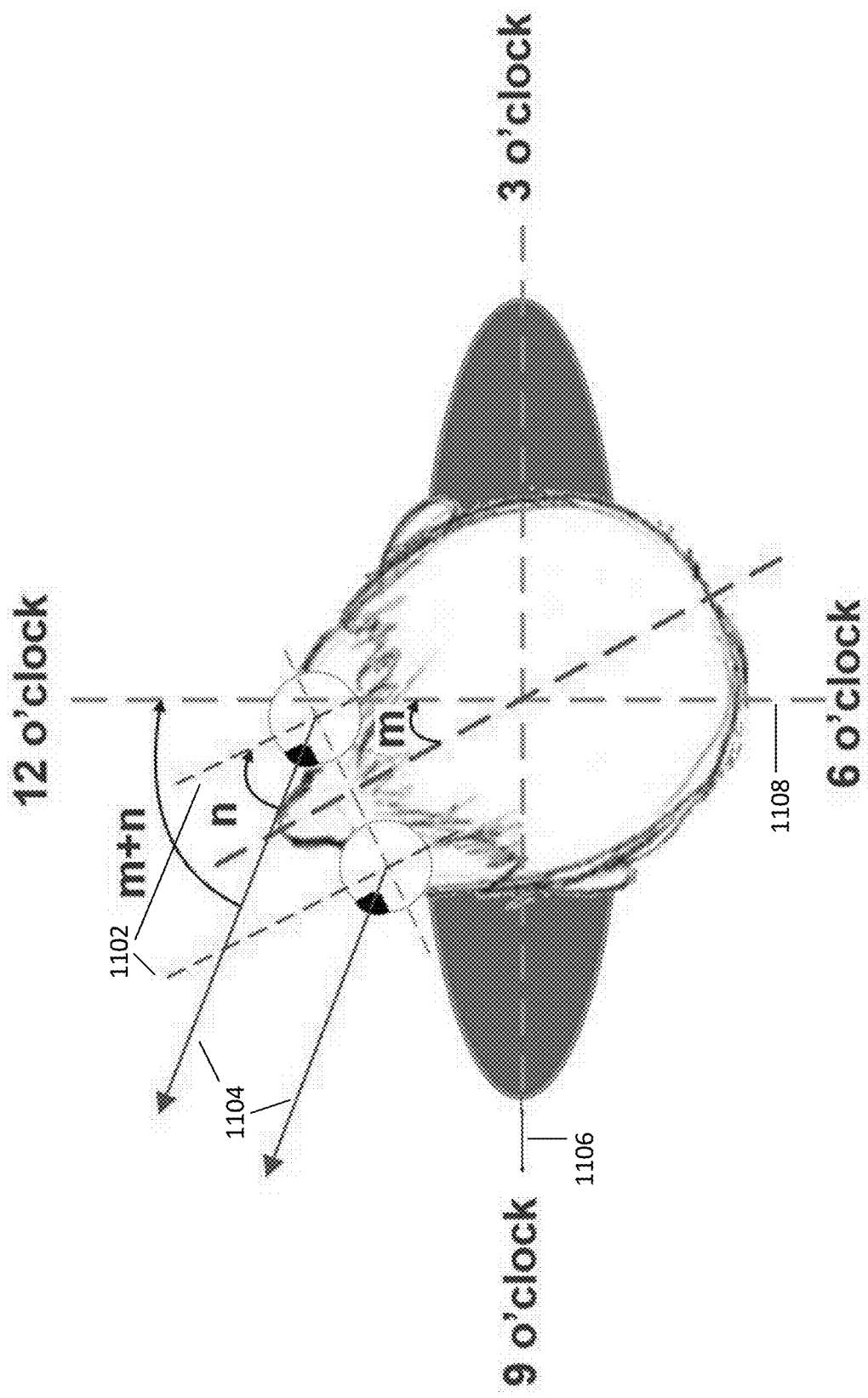
FIG. 11 shows elements of a gaze calculation.

FIG. 11 shows elements of a gaze calculation. According to one aspect of the disclosure, the system described herein may calculate a precise gaze of an occupant. According to another aspect of the disclosure, however, a precise gaze calculation may be unnecessary, and therefore it may suffice to omit one or more of the six degrees of freedom within the calculation, such omitting any of movement along an x-axis, a y-axis, a z-axis, roll, yaw, and pitch. For example, as described herein, it may be possible to calculate a gaze of sufficient accuracy using only the head position and the yaw angle of the eyeballs, as depicted in FIG. 11. In this figure, the dashed lines 1106 and 1108 represent perpendicular planes slicing through the occupant from a bird's eye perspective. The solid arrows 1104 indicate the direction the occupant is actually looking. The dashed lines 1102 along with angle 'm' indicate the yaw angle of the head with respect to a reference point. In this case, the reference point is, for example, 12 o'clock. Similarly, angle 'n' is the yaw angle of the eyeball. The sum 'm+n' provides the gaze direction in reference to the occupant's reference point. As will be described later herein, this aggregated angle for gaze determination may be calculated by the FAM.

Figure 12:
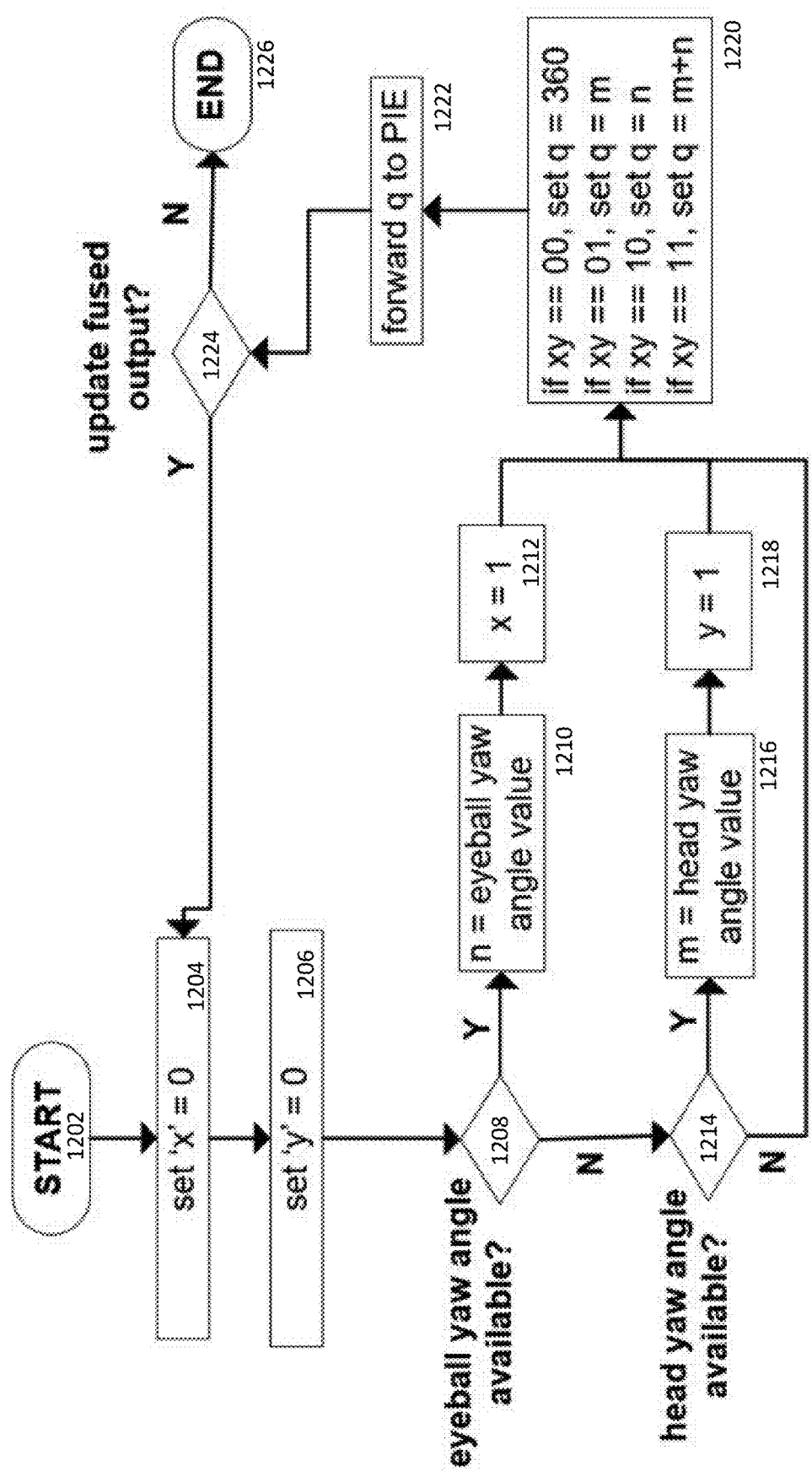
FIG. 12 depicts an operation of the Fusion & Adaptation Module (FAM) block according to an aspect of the disclosure.

FIG. 12 depicts an operation of the FAM block according to an aspect of the disclosure. Following the execution of the procedure 1202, binary state variables 'x' and 'y' are initialized to zero in the FAM, as shown by 1202 and 1204. These states permit conditional fusion in FAM, which may be desired in cases in which the yaw angles for the eyeball and/or the head may not be available. The yaw angle of the eyeball (i.e. 'n') is determined by the gaze estimator and may be calculated within the [−90,90] degree range. Similarly, the yaw angle of the head (i.e. 'm') is received from the head pose estimator block estimator, and may also vary between [−90,90] degrees. At the fusion stage, it is determined whether the eyeball yaw angle is available 1208 and whether the head yaw angle is available 1210. If the eyeball yaw angle n is available 1210, then x is set to 1, 1212. If the head yaw angle is available 1216, then y is set to 1, 1218. If either 'm' or 'n' are not available, only the available angle is forwarded to the Passenger Interaction Engine ("PIE") block 1222. If neither of the angles are available, the output value (i.e. 'q') is initialized to 360 degrees 1220, which is outside the valid range for q of −90 to 90 degrees, and thus indicates an unavailability of yaw angles to the PIE block. The FAM block may be configured to continuously update angle 'q' 1224, or it may calculate q once per activation, depending on the context of operation. This parameter can be made available as an option to the system designers. When the updates discontinue, then procedure ends 1226.

Figure 13:
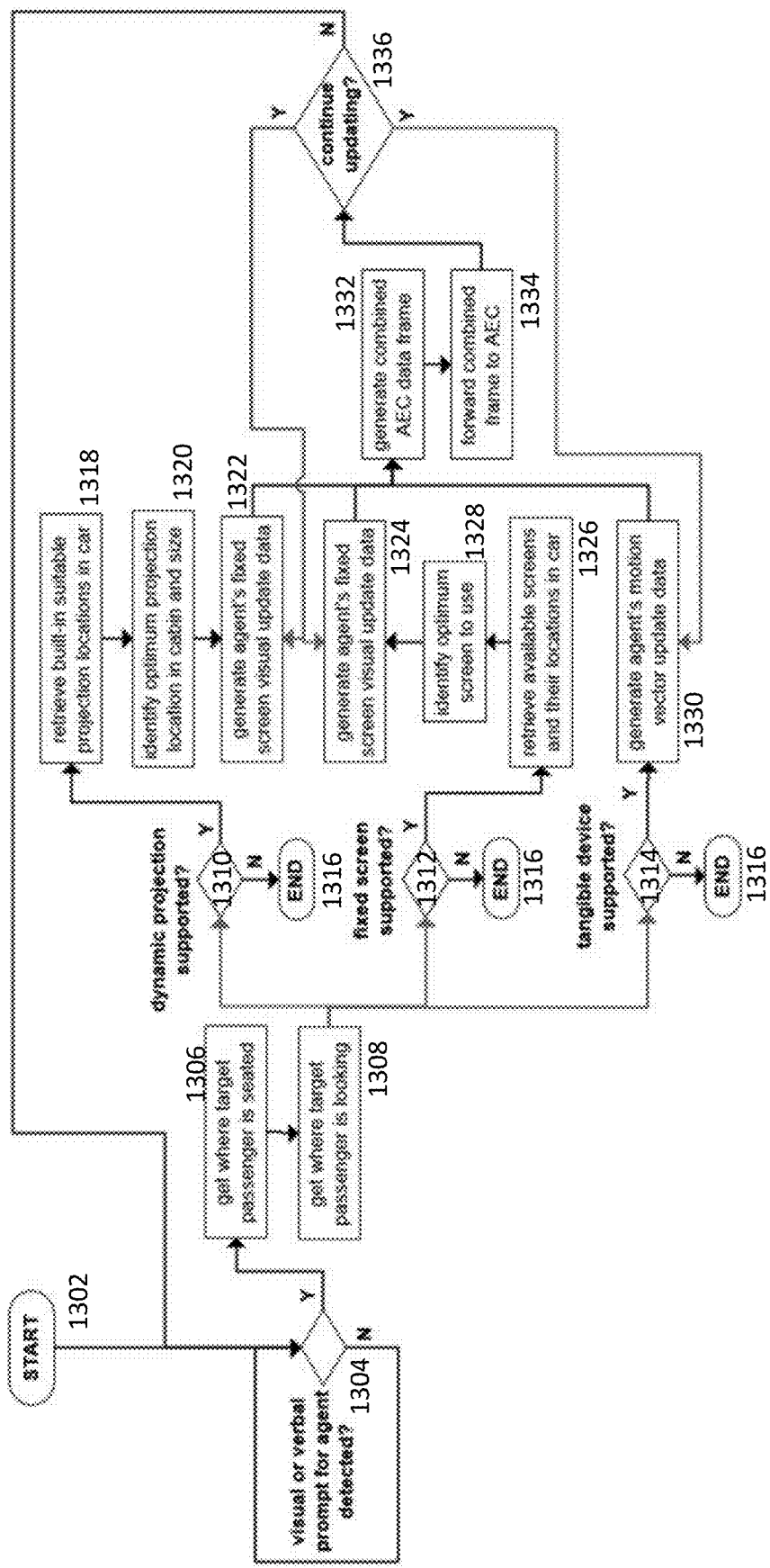
FIG. 13 depicts the Passenger Interaction Engine (PIE) according to an aspect of the disclosure.

FIG. 13 depicts the PIE according to an aspect of the disclosure. The PIE block may accept input from the FAM block, the occupant seating position related sensor information, and the vehicle's hardware configuration information. Optionally, audio based context information can be provided to PIE block in order to enhance its controller data provisioning capabilities (i.e. controller data output can be calculated based on audio as well as visual information). Upon activation 1302, the PIE block receives an audio prompt or a fused yaw angle availability 1304, and acquires the seating position of the occupant 1306A, as well as the occupant's fused yaw angle 1308 as provided by the FAM block. The PIE block then identifies which aspect or aspects of the disclosure are supported by the vehicle, whether projection of a visual tag 1310, displaying of a visual tag on one or more screens 1312, or interaction with an embodied agent 1314. In the event that no such support is available, the procedure ends 1316. The steps corresponding to 1310, 1312, and 1314 may operate in parallel, such as in a multi-threaded application. In the case of tangible device support, there will be one output device with a fixed location inside the vehicle. Therefore, identification of a target location for animating the agent may be irrelevant. The PIE simply generates the agent's motion vector data 1330 and creates a data frame compatible with the subsequent AEC block that will activate the tangible device according to the vector data specified. The vector data may be updated depending on the context of the interaction between the agent and the occupant (as a non-limiting example for demonstrative purposes, the embodied agent may wave at the occupant as it turns its head to face the occupant, when the occupant enters the vehicle) 1336.

In the case of dynamic projection and fixed screen embodiments 1312, there may be multiple candidate locations for the display of the visual tag. To manage the possibility of multiple locations, the available screens are first identified, and their locations within the vehicle are ascertained 1326. The preferred location is then identified based on occupant's gaze and the seating position 1328. With this information, the tag's fixed screen visual update data is generated 1324, the combined AEC data frame is generated 1332, and the combined frame is forwarded to the AEC 1334. In the event that dynamic projection is supported 1310, one or more suitable projection locations are identified 1318, and the desired projection location is identified from the potential projection locations based on the occupant's seating position in gaze 1320, and the visual tag's fixed screen visual update data is generated 1322. The combined AEC data frame is generated 1332, and the combined frame is forwarded to the AEC 1334.

Figure 14:
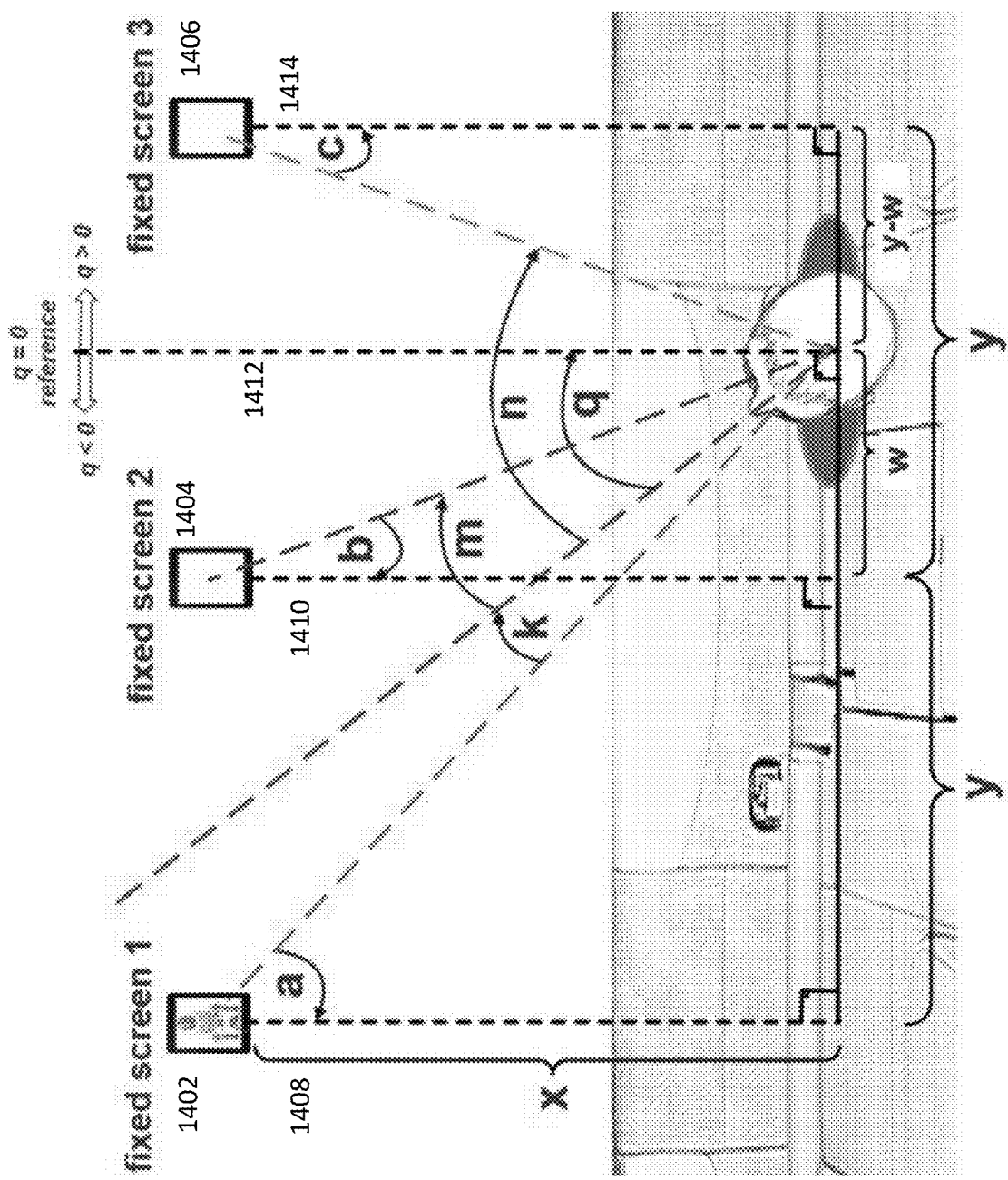
FIG. 14 depicts a procedure for identifying a desired location for projection or display of the visual tag.

FIG. 14 depicts a procedure for identifying a desired location for projection or display of the visual tag. In the event that a plurality of screens is used, any number of screens may be implemented, without limitation. For the sake of convenience, three screens are depicted in FIG. 14; however, the number of screens should not be understood as being limited to three. The procedures described herein may be implemented with one or more occupants sitting at any location within the vehicle. In this figure, the vehicle has three screens, screen one 1402, screen two 1404, and screen three 1406. The occupant is seated behind and between fixed screen to 1404 and fixed screen three 1406, but the occupant's gaze is directed toward fixed screen one 1402. Based on the annotations and representations in this figure, the following table lists the relevant critical parameters and their definitions before providing the calculation details:

| Parameter | Definition | Known/Unknown |
|---|---|---|
| x | Shortest distance between the mounted screens and the occupant's seat | Known (part of the vehicle's built-in attributes) |
| y | Separation between the two screens | Known (part of the vehicle's built-in attributes) |
| w | Distance of occupant seating position to nearest screen | Known (part of the vehicle's built-in attributes) |
| q | Fused yaw angle for the occupant's gaze | Known (provided by FAM) |
| a | Yaw angle when occupant looks directly at fixed screen one | Unknown (calculated based on seating position) |
| b | Yaw angle when occupant looks directly at fixed screen two | Unknown (calculated based on seating position) |
| c | Yaw angle when occupant looks directly at fixed screen three | Unknown (calculated based on seating position) |
| k | Days change effort angle when current occupant gaze needs to switch to fixed screen one | Unknown (calculated based on seating position and current gaze angle) |
| m | Days change effort angle when current occupant gaze needs to switch to fixed screen two | Unknown (calculated based on seating position and current gaze angle) |
| n | Days change effort angle when current occupant gaze needs to switch to fixed screen three | Unknown (calculated based on seating position and current gaze angle) |

Angles 'k', 'm' and 'n' may be compared to determine the angle with the smallest magnitude. The desired screen may be determined as the screen that will require the least effort for the occupant to shift the occupant's gaze, given the seating position and the current gaze direction. The number of calculations needed can be reduced through a process of elimination based on the sign of angle 'q' as indicated in FIG. 14. In the shown example, the sign of 'q' is negative, and therefore all the screens that give a positive 'q' when viewed by the occupant can be eliminated as candidate screens, as the occupant will have to spend more effort to redirect the occupant's gaze. Therefore, angle 'n' can be eliminated as a candidate screen, as fixed screen 3 requires more gaze redirection than Fixed Screen 1 or Fixed Screen 2. As the next step, the remaining angles 'k' and 'm' are calculated as follows.

$$a = \operatorname{atan}\left(\frac{w+y}{x}\right) \quad (1)$$

$$b = \operatorname{atan}\left(\frac{w}{x}\right) \quad (2)$$

$$k = ||q| - a| \quad (3)$$

$$m = ||q| - b| \quad (4)$$

Then the selection of the desired screen to display the embodiment can be made as follows:

If $k<m$, then use fixed screen 1 (5)

If $k<m$, then use fixed screen 1 (6)

The decision for case k=m is determined in exactly the same way as when angle 'q' is not made available by the FAM block (i.e. when q=360 degrees) In such cases, the embodiment target device can be selected based on the seating position of the occupant alone.

In the case of dynamic projection and fixed screen embodiments, because there are likely to be multiple candidate locations for the embodiments, identification of the desired location based on occupant gaze and the seating position will be required. In addition, the FAM may also be configured to select a desired location in situations in which the gaze estimation and/or the head pose estimation may not be available, as these are independently calculated and forwarded to FAM. Such corner cases are handled at the fusion stage in FAM.

Figure 15:
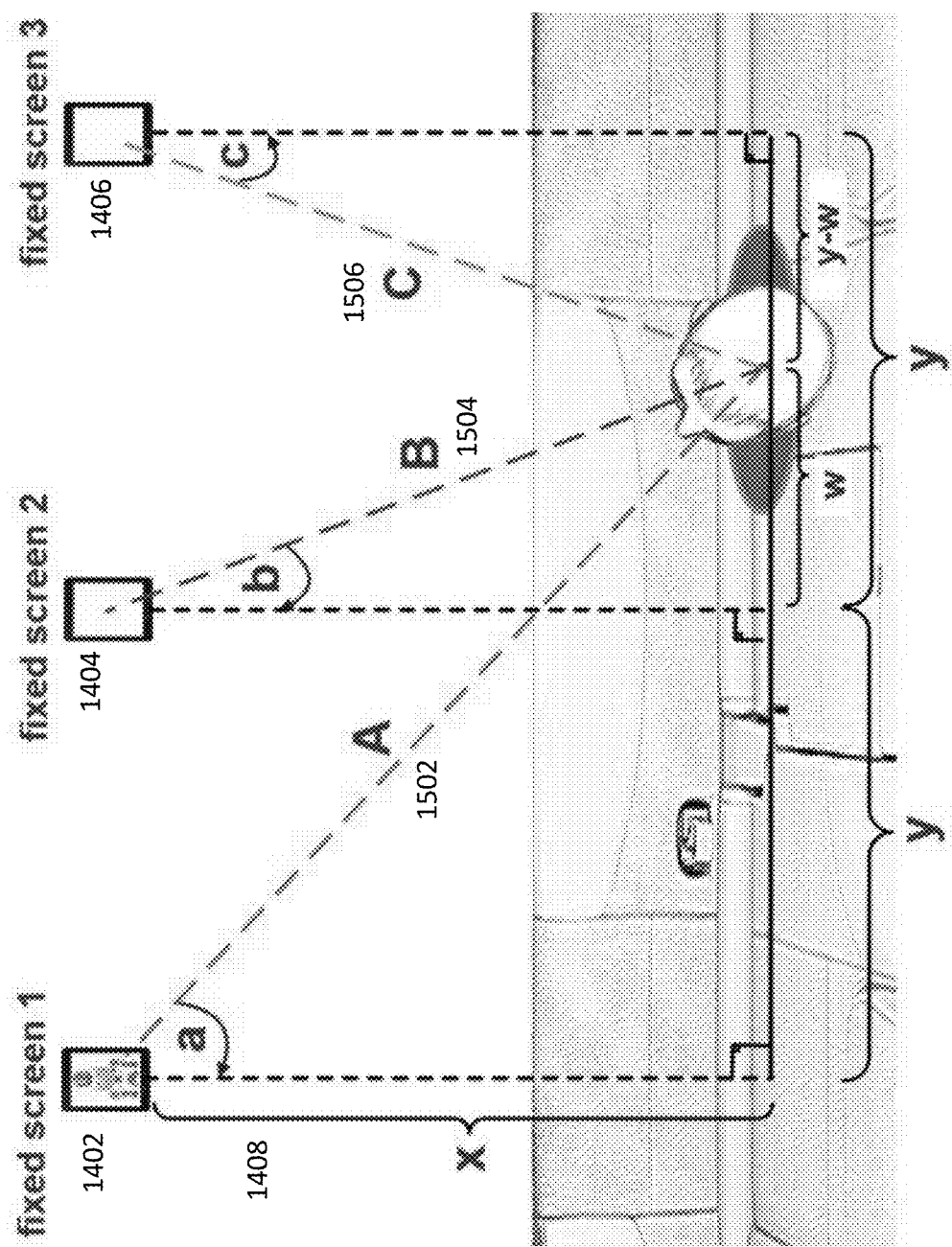
FIG. 15 depicts a determination of a preferred display location based on the passenger gaze direction with respect to the amount of deviation from line of sight to each available display in the vehicle.

FIG. 15 depicts a determination of a preferred display location in the event that one or more angles between the occupant and a display location are not available. In FIG. 14, Fixed Screen 3 could be eliminated as an option, thereby leaving Fixed Screen 1 and Fixed Screen 2 as potential options for a display location. In this situation, Fixed Screen 1 or Fixed Screen 2 may be selected as follows:

$$A = \sqrt{x^2 + (y+w)^2} \quad (7)$$

$$B = \sqrt{x^2 + w^2} \quad (8)$$

If $A>B$, then use fixed screen 2 (9)

If $A<B$, then use fixed screen 1 (10)

If angle 'q' is not available at the activation of PIE block operations (i.e. q=360 was sent to PIE input), then it may be necessary to additionally consider Eq. 11.

$$C = \sqrt{x^2 + (y-w)^2} \quad (11)$$

The decision process would then be modified as:

If $\min(A,B,C)=A$, then used fixed screen 1 (12)

If $\min(A,B,C)=B$, then used fixed screen 2 (13)

If $\min(A,B,C)=C$, then used fixed screen 3 (14)

where min(.) gives the argument with the minimum magnitude.

The above calculations within the PIE block can be repeated to ensure timely updating of the fixed screen display and the projection of the visual tag, based on occupant's gaze and the seating position changes as indicated in FIG. 13. Some implementations of the PIE block may permit improved decision-making, such as where the fusion takes certain occlusions inside the vehicle between the occupant and the candidate screens/projection locations into account before choosing the target display device and/or display location. This would require the PIE block to work in tandem with various object recognition sub-systems within the vehicle. The fusion algorithms disclosed herein can be applied to support such extensions.

Figure 16:
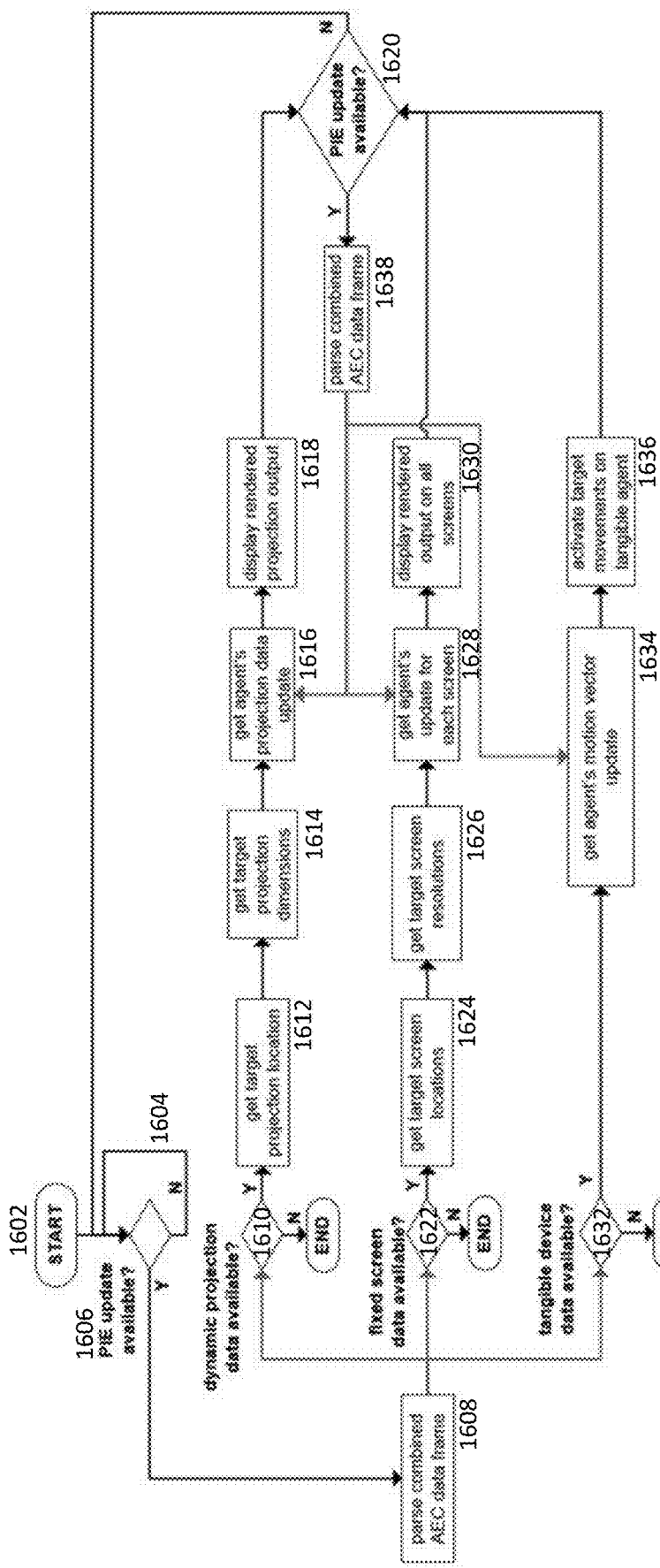
FIG. 16 depicts the Agent Embodiment Controller ("AEC")

FIG. 16 depicts the AEC, which activates the visual tag or physical embodied agent once the PIE block determines the display location and generates the required update data, all of which are integrated into an AEC data frame. FIG. 16 shows the operation of AEC, which is able to support projection of the visual tag, display of the visual tag on one or more displays, use of the physical embodied agent, or any combination thereof. As depicted herein, once the procedure begins 1602, it is determined whether a PIE update is available. If no update is available 1604, then a loop is created until an update is provided. Once an update is available 1606, the combined AEC data frame is parsed 1608. It is determined which modalities are supported by the vehicle, whether dynamic projection of the visual tag 1610, displaying on one or more screens 1622, or use of a physical embodied agent 1632. In the event that dynamic projection is available 1610, the target projection location or selected display location 1612 is obtained, and the target projection or selected display dimensions are configured 1614. A projection data update of the visual tag is updated 1616, and the rendered projection output is displayed at the selected location 1618. Once this is completed is analyzed whether any additional PIE update information is available 1620.

In the event that the visual tag is to be displayed on one or more fixed screens 1622, the target screen locations are determined 1624, as are the resolutions for one or more of the target screens 1626. An updated virtual tag information, if available, is provided for each screen on which the virtual tag will be displayed 1628. The virtual tag is then displayed on each screen that is selected 1630. It is noted that, as described herein in at least 1630, it may be contemplated that the visual tag would be displayed on more than one screen. According to one aspect of the disclosure, a specific screen may be selected for displaying the visual tag based on the methods described herein. A single location within the single screen may be selected for displaying the visual tag. According to another aspect of the disclosure however, it may be desirable to display the visual tag on a plurality of screens as described in 1630.

In the event that a physical embodied agent is used 1632, the agent's motion vector update is obtained 1634, and target movements on the agent are activated 1636.

In addition to the embodiment data updates, the AEC block also receives hardware related information directly from PIE, such as target projection dimensions, locations, and screen resolutions. According to another aspect of the disclosure, such information may also be provided to the AEC directly from other sub-systems in the vehicle, as this may be the preferred implementation for a vehicle manufacturer. The AEC block may also monitor the output of the PIE block to ensure that new updates are promptly applied to relevant devices to foster a smooth user experience.

Figure 17:
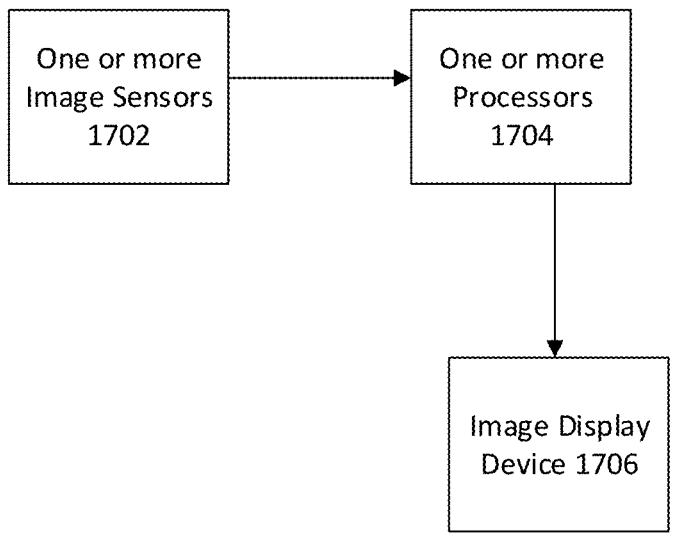
FIG. 17 depicts a vehicle tag system.

FIG. 17 depicts a vehicle tag system including one or more image sensors 1702, configured to receive one or more images of a vehicle occupant; one or more processors 1704, configured to determine a gaze direction of the vehicle occupant from the one or more images; select a display location corresponding to the determined gaze direction; and control an image display device 1706 to display a tag at the display location; the image display device 1706, configured to display the tag at the selected display location according to the one or more processors.

Figure 18:
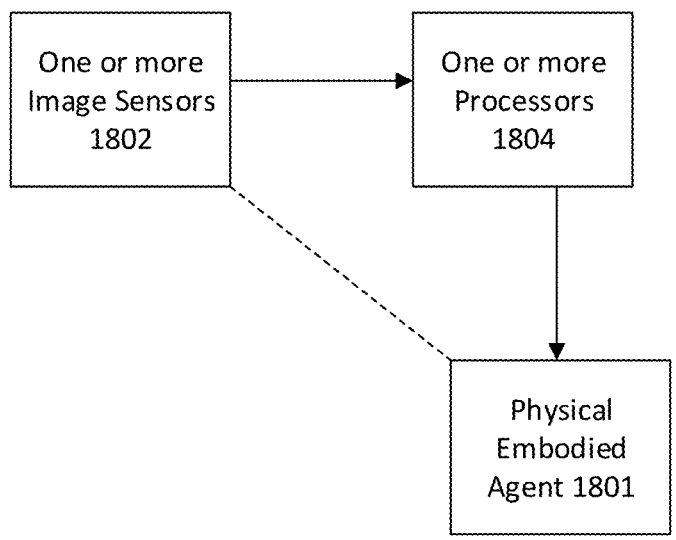
FIG. 18 depicts a vehicle embodied agent system.

FIG. 18 depicts a vehicle embodied agent system including a physical embodied agent 1801; one or more image sensors 1802, configured to receive one or more images of a vehicle occupant; and one or more processors 1804, configured to determine a gaze direction of the vehicle occupant from the one or more images; and control the physical embodied agent to execute a routine according to the determined gaze direction. The one or more image sensors 1802 may be located independently of the physical embodied agent 1801, or may be included within the physical embodied agent 1801. Similarly, the one or more processors 1804 may be located separately from the physical embodied agent 1801, or they may be located as part of the physical embodied agent 1801.

Figure 19:
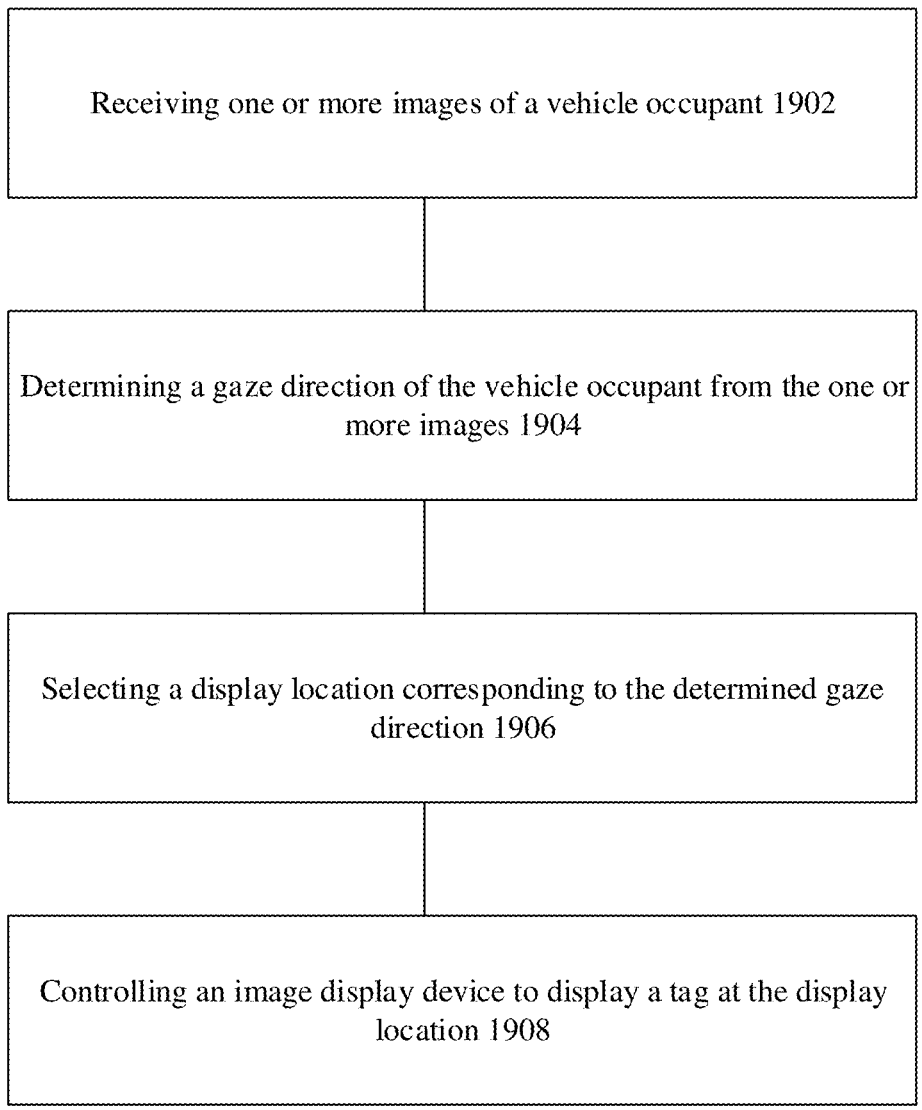
FIG. 19 depicts a method of displaying a tag.

FIG. 19 depicts a method of displaying a tag including receiving one or more images of a vehicle occupant 1902; determining a gaze direction of the vehicle occupant from the one or more images 1904; selecting a display location corresponding to the determined gaze direction 1906; and controlling an image display device to display a tag at the display location 1908.

As autonomous vehicles are developed, it is becoming more important for autonomous vehicles to develop the capability of understanding the intentions of vehicle occupants. Some intentions are simplistic and thus readily understandable. For example, it is a relatively straightforward task for an occupant to inform the vehicle of a desired destination at the beginning of travel. For example, an occupant may instruct a vehicle to travel to a specific destination or to use a specific route, which can be achieved with a simple verbal command. This interaction may require only speech recognition and an ability to cross-reference locations detected from the speech with actual geographical locations, such as being able to recognize a destination, and then identify the destination and a route thereto in a database. However, some interactions between occupants and the vehicle are more challenging, such as spontaneous ad hoc interactions, for example, as with en route modifications due to traffic problems or changes in the desired destination. Such situations require more nuanced conversations that may be beyond the capabilities of even the most robust speech to text systems. This may be due at least to the fact that information related to the occupant's intention is contained in modalities outside of the text itself, such as the expressions and gestures of the occupant.

The best results may be obtained by developing autonomous vehicles that are able to understand communication in the normal ways that humans communicate with one another. If for no other reason, this may owe to the fact that occupants can be assumed to have the most experience communicating with other persons. This may go beyond the simple text of a sentence, and include additional resources such as tone of voice, gesture, features of the environment, and emotional displays (both feigned and sincere). Removing any of the non-lexical features from the input to an autonomous vehicle agent may carry an unnecessary cost.

Devices that are sufficiently context aware can be a part of an autonomous vehicle system such that it can support fully natural communication. Such a system may have the ability to recognize speech, to identify the speaker, and to recognize emotional timbre, etc. The input must also include vision to support the use of gesture and other aspects of contextual awareness (e.g., seeing a phone in the occupant's hand or the building toward which the occupant is pointing). Such vision may be used as described herein in conjunction with speech to disambiguate the spoken reference.

The one or more image sensors may be any kind of image sensors, which are capable of obtaining an image of the vehicle occupant or occupants, without limitation. Furthermore, and depending on the desired configuration, the one or more image sensors may be configured to obtain images of one or more regions and/or objects in a vicinity of a vehicle. Any one or more image sensors may be individually capable of receiving images from both inside the vehicle and outside the vehicle, or they may receive images from either inside the vehicle or outside the vehicle and may deliver said images to the one or more processors for synthesis any/or any further processing. The images sensors may include, for example, a still camera, a video camera, a depth camera, an infrared camera, lidar, or radar. The one or more image sensors may be located at any position or combination of positions within the vehicle. Where a plurality of image sensors are used, the image sensors may be located generally within a single place on the vehicle, or may be located in multiple places, so as to obtain different vantages of one or more vehicle occupants. Where a plurality of image sensors are used, the data from the image sensors may be assessed separately from each image sensor, or the image data may be aggregated to form a singular image, which is then assessed by the one or more processors. The data aggregation may occur given any known image combining or image aggregation technique.

The one or more processors may be any type of processor whatsoever, which are capable of performing the tasks described herein. The one or more processors may be located anywhere within or external to the vehicle, depending on the implementation. Where the one or more processors are located within the vehicle, they may be located within the embodied agent, within the image display device, or anywhere else within the vehicle. Where the one or more processors are located external to the vehicle, they may be located in any place whatsoever, and the vehicle may be configured to transmit data such as image sensor data to the one or more processors, and to receive from the one or more processors information for projecting or displaying the visual tag, or information for execution of the embodied agent.

The gaze direction may be determined with respect to any location. According to one aspect of the disclosure, one or more fixed locations within the vehicle may be dedicated as a fixed location relative to which the gaze is determined. Determining the gaze may include any combination of determining a position of a vehicle occupant, determining a body orientation of the vehicle occupant, determining a head orientation of the vehicle occupant, and/or determining the eye orientation of the vehicle occupant.

The display location may be any surface on or within the vehicle. The display location may include, without limitation, a dashboard, a windshield, a window, a panel, a wall, a door, a ceiling, or any other portion of the vehicle.

The visual tag may be displayed or projected at any size or resolution. According to one aspect of the disclosure, the size and/or resolution of the visual tag may be selected based on any of a distance between the vehicle occupant and the display location, a projection quality of the display location, or any other feature.

As described herein, the gaze direction may be calculated from at least one of an eye position, a head position, a body position, a physical location of a vehicle occupant, or any combination thereof.

According to one aspect of the disclosure, the calculations for gaze direction may be simplified by calculating, where possible, a head yaw and eye yaw. This may be at least because the possibilities for displaying or projecting the visual tag may be greater horizontally than vertically. Otherwise stated, there may be many surfaces of roughly the same height, or roughly along the same horizontal plane, on which the visual tag may be projected or displayed; however, depending on the vehicle configuration, there may be fewer surfaces along a vertical plane on which the tag may be displayed. As such, it may be sufficient to calculate a head yaw and eye yaw, which may provide information about a location within the given horizontal plane at which the visual tag may ideally be projected or displayed.

Alternatively, any or all of the six degrees of freedom may be calculated with respect to any combination of eye position, head position, body position, or any combination thereof, and this information may be used to select a display location.

According to one aspect of the disclosure, the image display device may be a projector, which is configured to project the visual tag onto a surface. The projector may project the visual tag at any size or resolution desired. The one or more processors may be configured to modify the projection information to account for anything other than a projection surface that is perpendicular to the projection direction. That is, where the projection surface is flat but angled such that it is not perpendicular to the line of projection, the one or more processors may be configured to modify the projection data such that the projection on the angled projection surface appears to the vehicle occupant as an unmodified visual tag. Where the projection surface is uneven, such as with a curved surface, the one or more processors may be configured to modify the projection data such that the projection on the curved or uneven surface appears to the vehicle occupant as an unmodified visual tag. This modification may be performed using any known method including, but not limited to, any known projection mapping technique.

According to another aspect of the disclosure, the image display device may be a display, such as a screen that is configured to display one or more images. The display may be located at any position within the vehicle including, but not limited to, within a central console, on a rear surface of a seat, on a wall, on a ceiling, or anywhere else within the vehicle whatsoever. A plurality of displays may be arranged within the vehicle, such that selecting the display location includes selecting a particular display on which the visual tag will be displayed. Furthermore, selecting a display location may include selecting a particular point or points on the selected display on which the visual tag will be displayed. Where desired, a plurality of displays may be selected to jointly display the visual tag. Where this occurs, the visual tag may be repeatedly displayed on the plurality of displays, such that an identical or nearly identical image is found on each of the displays, or the visual tag may be divided, such that a portion of the visual tag is displayed on a first display, and a portion of the visual tag displayed on another display. This technique may incorporate any number of displays, as desired. The displays may be any kind of displays whatsoever, whether LCD, OLED, flat, curved, flexible, or otherwise.

According to another aspect of the disclosure, the system described herein may be equipped with the ability to coordinate a movement of an occupant within a vicinity of the vehicle. In normal human-to-human interaction, it is common to point or otherwise gesticulate toward an object that is the subject of a conversation. If communication between a human and a vehicle is limited to entering data into an interface, such as a screen or control, or by using voice cues devoid of physical information, such gestures cannot be included in communication with the vehicle.

It is thus anticipated that the vehicle may derive from the one or more image sensors a direction of a gesture of an occupant, such as a direction of pointing. Coordinates or headings for the direction may be obtained, which may be a vector, with either a calculated or predetermined length, a line extending in the direction of pointing, or otherwise. The vehicle may be equipped with one or more image sensors, which are configured to obtain images from the vicinity of the vehicle. The one or more processors may be configured to correlate a direction of the pointing using the vector, line, or otherwise, with the image data regarding the vicinity of the vehicle. Using this technique, the vehicle may be able to correlate a gesture with an object, such as pointing to a vehicle, a parking spot, a street, or otherwise. The one or more processors may be configured to incorporate this data into any available speech recognition, such that the vehicle may be assisted in understanding the occupant's intentions. For example, an occupant stating "Park over there" while pointing to a parking space may have provided the vehicle within insufficient information to complete the desired task, if only text or only gesture are considered; however, if the vehicle is able to understand both text and gesture, the vehicle may be equipped to locate the intended parking spot and carry out the command to park at that location.

Similarly, the vehicle may be equipped to correlate an occupant's gaze with an external location. This may be carried out in much the same way that the vehicle correlates a gesture or pointing with an exterior location. The vehicle may use any of the techniques described herein to identify a direction of an occupant's gaze, and may extend the direction of that gaze outward beyond the vehicle, until its intersection with an object is detected by one or more image sensors obtaining image data about the vicinity of the vehicle.

Using the above-described techniques, the vehicle may also correlate an occupant's gaze and an occupant's gesture to identify an external location. In this case, a direction of the occupant's gaze and a direction of the occupant's gesture may be correlated with information about the vicinity of the vehicle to identify an object or location external to the vehicle. Because an occupant's gesture, such as with an upper extremity, originates from a different physical place than an occupant's gaze, vectors and/or lines extending in the direction of the gaze and pointing may ultimately intersect. This point of intersection may correspond with an intended object or location. A vector or line corresponding to a determined gaze, and a vector or line corresponding to a determined gesture, may be in two different planes and would thus not intersect. According to one aspect of the disclosure, one or both of the vectors and/or lines may be modified such that the vector or line corresponding to the determined gaze and the vector or line corresponding to the determined gesture may be modified to be within the same plane and thus intersect.

According to another aspect of the disclosure, the vehicle may be equipped with a physical embodied agent. The physical embodied agent may be a physical, three-dimensional representation of the vehicle and/or its artificial intelligence. The physical embodied agent may take any form whatsoever, including a three-dimensional variety of any form described herein with respect to the visual tag.

Upon determining an occupant's gaze, the one or more processors may control the physical embodied agent to execute a routine. The routine may be any routine whatsoever. Non-limiting examples of said routine may include turning the physical embodied agent to face the occupant, causing the physical embodied agent to perform one or more gestures, causing the head of the physical embodied agent to turn toward the occupant, or causing the eyes of the physical embodied agent to turn toward the occupant, or toward a third location to enable a shared focus with the occupant.

The physical embodied agent may include one or more joints or movable or bendable portions. The physical embodied agent may be configured to adjust the one or more joints or movable or bendable portions so as to change position and/or posture within the vehicle, or to gesticulate in any way. The joints may be configured in a manner such as to mimic or approximate human movement, or in any other manner desired.

According to one aspect of the disclosure, the projector may be a hologram projector, and the virtual agent may be projected in the form of a hologram. In this case, the one or more image sensors will detect the head position and an eye position as described herein, and the detected head position and an eye position will be mapped to an area of the vehicle. The one or more processors may be configured to cause the hologram projector to project the hologram of the virtual agent in an area corresponding to the mapped area, as determined from the calculated head position and an eye position. Where the hologram is configured as a three dimensional hologram, the hologram of the virtual agent may be rotated, such that the virtual agent appears to face the vehicle occupant. This may include rotating the virtual agent any number of degrees. Alternatively, the virtual agent may be rotated to appear to look at or point to an object in a direction other than the vehicle occupant.

Although the methods and procedures described herein have been detailed with respect to a vehicle, such as an autonomous vehicle, the methods and procedures described herein may also be applied to situations other than in the vehicle, such as in buildings, in public spaces, or otherwise. The one or more image sensors may be placed in any location to obtain image data of a person, and the person's head position and an eye position may be determined in the manner described herein. The combined head position and an eye position may be used to determine a gaze of the person, and a location may be selected for displaying an intelligent agent based on the determined gaze. Whereas this has been described with respect to a vehicle, the person may be located in any place whatsoever, whether in a building, or outside. Where a physical embodied agent is used, the physical embodied agent may be configured to perform one or more activities or trigger one or more activities based on the determined gaze in the manner described with respect to the physical embodied agent in the vehicle herein. Possible nonlimiting examples of extra-vehicular places where this technology may be used include stores, commercial establishments, schools, public buildings, private buildings, public outdoor spaces, private outdoor spaces, and homes. In a multiple vehicle-occupant scenario, the projection and/or display of the embodied agent may be performed such that multiple embodied agents are projected or displayed. That is, an embodied agent may be displayed for each of multiple vehicle occupants. Thus, the one or more processors may be configured to display, control, animate, or otherwise operate multiple embodied agents concurrently. In some scenarios, such as in the event that a projection mapping technology is used with multiple occupants, it may be undesirable to use a single embodied agent for two or more vehicle occupants, due at least to projection mapping's dependence upon viewing angle.

Alternatively, in a multiple vehicle-occupant scenario, it may be desirable to select a single location for projection of the embodied agent. For at least the reasons stated above, and particularly where a projection mapping algorithm is employed, selection of a single location for multiple occupants may create additional challenges, since effective execution of the projection mapping technology may be dependent on a viewing angles of the one or more occupants. This is, if an ideal projection mapping is implemented for a specific viewing angle of a single occupant, the resulting projection may appear skewed or otherwise distorted from a viewing angle of another occupant. According to one aspect of the disclosure, in the event that a plurality of occupants are present in the vehicle, and a single projection of the embodied agent for two or more occupants is desired, a single projection location may be selected as a compromise between two or more ideal projection angles. The single projection location may be selected to provide an acceptable representation of the embodied agent for the two or more occupants. The projection location may be selected based on at least one of the occupants' gazes, the occupants' viewing angles of the projection, a calculated distortion of the projection in light of the occupants' viewing angles, and any combination thereof.

According to another aspect of the disclosure, and in a multiple-occupant situation, the one or more processors may be configured to determine from images of two or more occupants a joint occupant gaze. In conversation, humans may engage in joint gaze, wherein the humans direct their gaze to a common point of focus, such as looking at a single object, at a single region, or a common space. This may occur, for example, when humans pass an object from one human to another, as they may direct their gaze from a face of a conversation partner to the object that is being passed. The one or more processors may be configured to determine a location of joint occupant gaze. Where an area of joint occupant gaze is present, the one or more processors may be configured to configure the embodied agent to also appear to direct its attention to the area of joint gaze. That is, the body, head, and/or eyes may appear to turn toward the area of join occupant gaze.

The following examples pertain to various aspects of the Disclosure:

In Example 1, a vehicle tag system is disclosed comprising one or more image sensors, configured to receive one or more images of a vehicle occupant; one or more processors, configured to determine a gaze direction of the vehicle occupant from the one or more images; select a display location corresponding to the determined gaze direction; and control an image display device to display a tag at the display location; the image display device, configured to display the tag at the selected display location according to the one or more processors.

In Example 2, the vehicle tag system of Example 1 is disclosed, wherein the one or more processors are configured to determine the gaze direction of the vehicle occupant from the one or more images by determining from the one or more images a head position and an eye position of the vehicle occupant.

In Example 3, the vehicle tag system of Example 1 is disclosed, wherein the one or more processors are configured to determine from the one or more images a head yaw and an eye yaw, and wherein determining gaze direction comprises combining the determined head yaw and eye yaw.

In Example 4, the vehicle tag system of any one of Examples 1 to 3 is disclosed, wherein the image display device is a projector is disclosed, wherein controlling the image display device to display the tag comprises controlling the projector to project the tag onto the selected display location.

In Example 5, the vehicle tag system of Example 4 is disclosed, further comprising determining distances between the projector and a plurality of points on the selected display location, and modifying the tag according to a projection mapping algorithm based on the determined distances.

In Example 6, the vehicle tag system of any one of Examples 1 to 3 is disclosed, wherein the image display device is a display, and wherein controlling the display to display the tag at the selected display location comprises determining a location on the display that corresponds to the determined gaze direction and controlling the display to display the tag at the determined location.

In Example 7, the vehicle tag system of Example 6 is disclosed, wherein the display is one of a flat screen display, a curved screen display, or a flexible screen display.

In Example 8, the vehicle tag system of any one of Examples 1 to 3 is disclosed, further comprising a plurality of image display devices within the vehicle is disclosed, wherein the plurality of image display devices are displays, and wherein selecting the display location comprises selecting one of the plurality of displays corresponding to the determined gaze direction, and wherein controlling the image display device to display the tag at the selected display location comprises controlling the selected display to display the tag.

In Example 9, the vehicle tag system of Example 8 is disclosed, wherein the plurality of displays comprise at least a flat display, a curved display, a flexible display, of any combination thereof.

In Example 10, the vehicle tag system of any one of Examples 1 to 9 is disclosed, wherein the tag is an embodied agent.

In Example 11, the vehicle tag system of any one of Examples 1 to 9 is disclosed, wherein the tag is an avatar.

In Example 12, the vehicle tag system of any one of Examples 1 to 9 is disclosed, wherein the tag is a physical representation of an artificial intelligence.

In Example 13, the vehicle tag system of any one of Examples 1 to 12 is disclosed, wherein, if the vehicle comprises a plurality of vehicle occupants, the one or more processors are configured to identify the plurality of vehicle occupants in the one or more images; select one of the vehicle occupants according to a selection instruction; determine a gaze direction of the selected vehicle occupant from the one or more images; select a display location corresponding to the determined gaze direction; and control the image display device to display a tag at the display location.

In Example 14, the vehicle tag system of any one of Examples 1 to 13 is disclosed, further comprising one or more sensors, configured to receive information of a vicinity of the vehicle; and wherein the one or more processors are further configured to select a point in the vicinity of the vehicle corresponding to a visual cue of the vehicle occupant.

In Example 15, the vehicle tag system of Example 14 is disclosed, wherein the visual cue is a gaze direction of the occupant.

In Example 16, the vehicle tag system of Example 14 or 15 is disclosed, wherein the visual cue is a direction of an upper extremity of an occupant, and wherein the one or more processors are further configured to detect from the one or more images an upper extremity of an occupant; and determine the visual cue according to a direction of the upper extremity.

In Example 17, the vehicle tag system of Example 16 is disclosed, further comprising selecting a point in the vicinity of the vehicle corresponding to both the gaze direction and the direction of the upper extremity.

In Example 18, a vehicle embodied agent system is disclosed comprising: a physical embodied agent; one or more image sensors, configured to receive one or more images of a vehicle occupant; and one or more processors, configured to determine a gaze direction of the vehicle occupant from the one or more images; and control the physical embodied agent to execute a routine according to the determined gaze direction.

In Example 19, the vehicle embodied agent system of Example 18 is disclosed, wherein the one or more processors are configured to determine the gaze direction of the vehicle occupant from the one or more images by determining from the one or more images a head position and an eye position of the vehicle occupant.

In Example 20, the vehicle embodied agent system of Example 18 is disclosed, wherein the one or more processors are configured to determine from the one or more images a head yaw and an eye yaw, and wherein determining gaze direction comprises combining the determined head yaw and eye yaw.

In Example 21, the vehicle embodied agent system of Example 18 is disclosed, wherein the one or more processors are configured to determine the gaze direction of the vehicle occupant by determining from the one or more images a head position and an eye position of the vehicle occupant.

In Example 22, the vehicle embodied agent system of any one of Examples 18 to 21 is disclosed, wherein the physical embodied agent is configured with a moveable portion comprising at least one of a moveable head; moveable eyes; a moveable torso; one or more moveable appendages; or any combination thereof.

In Example 23, the vehicle embodied agent system of Example 22 is disclosed, wherein executing a routine comprises moving a moveable portion.

In Example 24, the vehicle embodied agent system of Example 22 or 23 is disclosed, wherein executing a routine comprises moving a moveable portion such that the embodied agent's eyes are positioned to face the occupant.

In Example 25, the vehicle embodied agent system of any one of Examples 18 to 24 is disclosed, further comprising one or more sensors, configured to receive information of a vicinity of the vehicle; and wherein executing the routine comprises selecting a point in the vicinity of the vehicle corresponding to a visual cue of the vehicle occupant.

In Example 26, the vehicle embodied agent system of Example 25 is disclosed, wherein the visual cue is a gaze direction of the occupant.

In Example 27, the vehicle embodied agent system of Example 25 or 26 is disclosed, wherein the visual cue is a direction of an upper extremity of an occupant, and wherein the one or more processors are further configured to detect from the one or more images an upper extremity of an occupant; and determine the visual cue according to a direction of the upper extremity.

In Example 28, the vehicle tag system of Example 27 is disclosed, further comprising selecting a point in the vicinity of the vehicle corresponding to both the gaze direction and the direction of the upper extremity.

In Example 29, the vehicle embodied agent system of any one of Examples 22 to 28 is disclosed, wherein the one or more processors are further configured to control the moveable portion to move based on the determined gaze direction.

In Example 30, the vehicle embodied agent system of any one of Examples 22 to 29 is disclosed, wherein the one or more processors are further configured to control the moveable portion to move based on the upper extremity position.

In Example 31, the vehicle embodied agent system of any one of Examples 22 to 30 is disclosed, wherein the one or more processors are further configured to control the moveable portion to move based on both the determined gaze direction and the determined upper extremity position.

In Example 32, the vehicle embodied agent system of any one of Examples 22 to 30 is disclosed, wherein the one or more processors are further configured to control the moveable portion to move based on a movement of the occupant.

In Example 33, the vehicle embodied agent system of any one of Examples 18 to 32 is disclosed, wherein the physical embodied agent is a robot.

In Example 34, the vehicle embodied agent system of any one of Examples 18 to 32 is disclosed, wherein the physical embodied agent comprises a mechanical likeness of a human being.

In Example 35, a method of displaying a tag is disclosed comprising receiving one or more images of a vehicle occupant; determining a gaze direction of the vehicle occupant from the one or more images; selecting a display location corresponding to the determined gaze direction; and controlling an image display device to display a tag at the display location.

In Example 36, the method of displaying a tag of Example 35 is disclosed, wherein determining the gaze direction of the vehicle occupant from the one or more images comprises determining from the one or more images a head position and an eye position of the vehicle occupant.

In Example 37, the method of displaying a tag of Example 35 is disclosed, further comprising determining from the one or more images a head yaw and an eye yaw, and wherein determining gaze direction comprises combining the determined head yaw and eye yaw.

In Example 38, the method of displaying a tag of any one of Examples 35 to 37 is disclosed, wherein controlling the image display device to display the tag comprises controlling a projector to project the tag onto the selected display location.

In Example 39, the method of displaying a tag of Example 38 is disclosed, further comprising determining distances between the projector and a plurality of points on the selected display location, and modifying the tag according to a projection mapping algorithm based on the determined distances.

In Example 40, the method of displaying a tag of any one of Examples 35 to 39 is disclosed, wherein controlling the image display device to display the tag at the selected display location comprises determining a location on a display that corresponds to the determined gaze direction and controlling the display to display the tag at the determined location.

In Example 41, the method of displaying a tag of any one of Examples 35 to 40 is disclosed, wherein selecting the display location comprises selecting one of a plurality of displays corresponding to the determined gaze direction, and wherein controlling the image display device to display the tag at the selected display location comprises controlling the selected display to display the tag.

In Example 42, the method of displaying a tag of any one of Examples 35 to 41 is disclosed, wherein the tag is an embodied agent.

In Example 43, the method of displaying a tag of any one of Examples 35 to 41 is disclosed, wherein the tag is an avatar.

In Example 44, the method of displaying a tag of any one of Examples 35 to 43 is disclosed, wherein the tag is a physical representation of an artificial intelligence.

In Example 45, the method of displaying a tag of any one of Examples 35 to 44 is disclosed, wherein, if the vehicle comprises a plurality of vehicle occupants, the one or more processors are configured to identify the plurality of vehicle occupants in the one or more images; select one of the vehicle occupants according to a selection instruction; determine a gaze direction of the selected vehicle occupant from the one or more images; select a display location corresponding to the determined gaze direction; and control the image display device to display a tag at the display location.

In Example 46, the method of displaying a tag of any one of Examples 35 to 45 is disclosed, further comprising receiving from one or more sensors information of a vicinity of the vehicle; and selecting a point in the vicinity of the vehicle corresponding to a visual cue of the vehicle occupant.

In Example 47, the method of displaying a tag of Example 46 is disclosed, wherein the visual cue is a gaze direction of the occupant.

In Example 48, the method of displaying a tag of Example 46 or 47 is disclosed, wherein the visual cue is a direction of an upper extremity of an occupant; further comprising detecting from the one or more images an upper extremity of an occupant; and determining the visual cue according to a direction of the upper extremity.

In Example 49, the method of displaying a tag of Example 48 is disclosed, further comprising selecting a point in the vicinity of the vehicle corresponding to both the gaze direction and the direction of the upper extremity.

In Example 50, a method of operating a physical embodied agent is disclosed comprising receiving from one or more sensors one or more images of a vehicle occupant; determining a gaze direction of the vehicle occupant from the one or more images; and controlling the physical embodied agent to execute a routine according to the determined gaze direction.

In Example 51, the method of operating a physical embodied agent of Example 50 is disclosed, further comprising determine the gaze direction of the vehicle occupant from the one or more images by determining from the one or more images a head position and an eye position of the vehicle occupant.

In Example 52, the method of operating a physical embodied agent of Example 50 is disclosed, further comprising determining from the one or more images a head yaw and an eye yaw, and wherein determining gaze direction comprises combining the determined head yaw and eye yaw.

In Example 53, the method of operating a physical embodied agent of Example 52 is disclosed, further comprising determining the gaze direction of the vehicle occupant by determining from the one or more images a head position and an eye position of the vehicle occupant.

In Example 54, the method of operating a physical embodied agent of any one of Examples 50 to 53 is disclosed, wherein the physical embodied agent is configured with a moveable portion comprising at least one of a moveable head; moveable eyes; a moveable torso; one or more moveable appendages; or any combination thereof.

In Example 55, the method of operating a physical embodied agent of Example 54 is disclosed, wherein executing a routine comprises moving a moveable portion.

In Example 56, the method of operating a physical embodied agent of Example 54 or 55 is disclosed, wherein executing a routine comprises moving a moveable portion such that the embodied agent's eyes are positioned to face the occupant.

In Example 57, the method of operating a physical embodied agent of any one of Examples 50 to 56, further receiving from one or more sensors information of a vicinity of the vehicle; and wherein executing the routine comprises selecting a point in the vicinity of the vehicle corresponding to a visual cue of the vehicle occupant.

In Example 58, the method of operating a physical embodied agent of Example 57 is disclosed, wherein the visual cue is a gaze direction of the occupant.

In Example 59, the method of operating a physical embodied agent of Example 57 or 58 is disclosed, wherein the visual cue is a direction of an upper extremity of an occupant; further comprising detecting from the one or more images an upper extremity of an occupant; and determining the visual cue according to a direction of the upper extremity.

In Example 60, the method of operating a physical embodied agent of Example 59 is disclosed, further comprising selecting a point in the vicinity of the vehicle corresponding to both the gaze direction and the direction of the upper extremity.

In Example 61, the method of operating a physical embodied agent of any one of Examples 54 to 60 is disclosed, further comprising controlling the moveable portion to move based on the determined gaze direction.

In Example 62, the method of operating a physical embodied agent of any one of Examples 54 to 61 is disclosed, further comprising controlling the moveable portion to move based on the upper extremity position.

In Example 63, the method of operating a physical embodied agent of any one of Examples 54 to 62 is disclosed, further comprising controlling the moveable portion to move based on both the determined gaze direction and the determined upper extremity position.

In Example 64, the method of operating a physical embodied agent of any one of Examples 54 to 63 is disclosed, further comprising controlling the moveable portion to move based on a movement of the occupant.

In Example 65, the method of operating a physical embodied agent of any one of Examples 35 to 64 is disclosed, wherein the physical embodied agent is a robot.

In Example 66, the method of operating a physical embodied agent of any one of Examples 35 to 64 is disclosed, wherein the physical embodied agent comprises a mechanical likeness of a human being.

In Example 67, the method of operating a physical embodied agent of Example 4 or 5 is disclosed, wherein the projector is a hologram projector, and the virtual agent is projected as a hologram.

In Example 68, a virtual embodiment display system is disclosed comprising: one or more image sensors, configured to receive one or more images of a vehicle occupant; one or more processors, configured to determine a gaze direction of the vehicle occupant from the one or more images; select a display location corresponding to the determined gaze direction; and control an image display device to display a virtual embodiment of an intelligent agent at the display location; the image display device, configured to display the virtual embodiment of the intelligent agent at the selected display location according to the one or more processors.

In Example 69, the virtual embodiment display system of Example 68 is disclosed, wherein the one or more processors are configured to determine the gaze direction of the vehicle occupant from the one or more images by determining from the one or more images a head position and an eye position of the vehicle occupant.

In Example 70, the virtual embodiment display system of Example 68 is disclosed, wherein the one or more processors are configured to determine from the one or more images a head yaw and an eye yaw, and wherein determining gaze direction comprises combining the determined head yaw and eye yaw.

In Example 71, the virtual embodiment display system of any one of Examples 68 to 70 is disclosed, wherein the image display device is a projector is disclosed, wherein controlling the image display device to display the virtual embodiment of the intelligent agent comprises controlling the projector to project the virtual embodiment of the intelligent agent onto the selected display location.

In Example 72, the virtual embodiment display system of Example 71 is disclosed, further comprising determining distances between the projector and a plurality of points on the selected display location, and modifying the virtual embodiment of the intelligent agent according to a projection mapping algorithm based on the determined distances.

In Example 73, the virtual embodiment display system of any one of Examples 68 to 70 is disclosed, wherein the image display device is a display, and wherein controlling the display to display the virtual embodiment of the intelligent agent at the selected display location comprises determining a location on the display that corresponds to the determined gaze direction and controlling the display to display the virtual embodiment of the intelligent agent at the determined location.

In Example 74, the virtual embodiment display system of Example 73 is disclosed, wherein the display is one of a flat screen display, a curved screen display, or a flexible screen display.

In Example 75, the virtual embodiment display system of any one of Examples 68 to 70 is disclosed, further comprising a plurality of image display devices within the vehicle is disclosed, wherein the plurality of image display devices are displays, and wherein selecting the display location comprises selecting one of the plurality of displays corresponding to the determined gaze direction, and wherein controlling the image display device to display the virtual embodiment of the intelligent agent at the selected display location comprises controlling the selected display to display the virtual embodiment of the intelligent agent.

In Example 76, the virtual embodiment display system of Example 75 is disclosed, wherein the plurality of displays comprise at least a flat display, a curved display, a flexible display, of any combination thereof.

In Example 77, the virtual embodiment display system of any one of Examples 68 to 76 is disclosed, wherein the virtual embodiment of the intelligent agent is an embodied agent.

In Example 78, the virtual embodiment display system of any one of Examples 68 to 77 is disclosed, wherein the virtual embodiment of the intelligent agent is an avatar.

In Example 79, the virtual embodiment display system of any one of Examples 68 to 78 is disclosed, wherein the virtual embodiment of the intelligent agent is a physical representation of an artificial intelligence.

In Example 80, the virtual embodiment display system of any one of Examples 68 to 79 is disclosed, wherein, if the vehicle comprises a plurality of vehicle occupants, the one or more processors are configured to: identify the plurality of vehicle occupants in the one or more images; select one of the vehicle occupants according to a selection instruction; determine a gaze direction of the selected vehicle occupant from the one or more images; select a display location corresponding to the determined gaze direction; and control the image display device to display a virtual embodiment of the intelligent agent at the display location.

In Example 81, the virtual embodiment display system of any one of Examples 68 to 80 is disclosed, further comprising one or more sensors, configured to receive information of a vicinity of the vehicle; and wherein the one or more processors are further configured to select a point in the vicinity of the vehicle corresponding to a visual cue of the vehicle occupant.

In Example 82, the virtual embodiment display system of Example 81 is disclosed, wherein the visual cue is a gaze direction of the occupant.

In Example 83, the virtual embodiment display system of Example 81 or 82 is disclosed, wherein the visual cue is a direction of an upper extremity of an occupant, and wherein the one or more processors are further configured to detect from the one or more images an upper extremity of an occupant; and determine the visual cue according to a direction of the upper extremity.

In Example 84, the virtual embodiment display system of Example 83 is disclosed, further comprising selecting a point in the vicinity of the vehicle corresponding to both the gaze direction and the direction of the upper extremity.

In Example 85, a vehicle embodied agent system is disclosed comprising a physical embodiment of the intelligent agent; one or more image sensors, configured to receive one or more images of a vehicle occupant; and one or more processors, configured to determine a gaze direction of the vehicle occupant from the one or more images; and control the physical embodiment of the intelligent agent to execute a routine according to the determined gaze direction.

In Example 86, the vehicle embodied agent system of Example 85 is disclosed, wherein the one or more processors are configured to determine the gaze direction of the vehicle occupant from the one or more images by determining from the one or more images a head position and an eye position of the vehicle occupant.

In Example 87, the vehicle embodied agent system of Example 85 is disclosed, wherein the one or more processors are configured to determine from the one or more images a head yaw and an eye yaw, and wherein determining gaze direction comprises combining the determined head yaw and eye yaw.

In Example 88, the vehicle embodied agent system of Example 85 is disclosed, wherein the one or more processors are configured to determine the gaze direction of the vehicle occupant by determining from the one or more images a head position and an eye position of the vehicle occupant.

In Example 89, the vehicle embodied agent system of any one of Examples 85 to 88 is disclosed, wherein the physical embodiment of the intelligent agent is configured with a moveable portion comprising at least one of a moveable head; moveable eyes; a moveable torso; one or more moveable appendages; or any combination thereof.

In Example 90, the vehicle embodied agent system of Example 89 is disclosed, wherein executing a routine comprises moving a moveable portion.

In Example 91, the vehicle embodied agent system of Example 89 or 90 is disclosed, wherein executing a routine comprises moving a moveable portion such that the embodied agent's eyes are positioned to face the occupant.

In Example 92, the vehicle embodied agent system of any one of Examples 85 to 91 is disclosed, further comprising one or more sensors, configured to receive information of a vicinity of the vehicle; and wherein executing the routine comprises selecting a point in the vicinity of the vehicle corresponding to a visual cue of the vehicle occupant.

In Example 93, the vehicle embodied agent system of Example 92 is disclosed, wherein the visual cue is a gaze direction of the occupant.

In Example 94, the vehicle embodied agent system of Example 92 or 93 is disclosed, wherein the visual cue is a direction of an upper extremity of an occupant, and wherein the one or more processors are further configured to detect from the one or more images an upper extremity of an occupant; and determine the visual cue according to a direction of the upper extremity.

In Example 95, the virtual embodiment display system of Example 94 is disclosed, further comprising selecting a point in the vicinity of the vehicle corresponding to both the gaze direction and the direction of the upper extremity.

In Example 96, the vehicle embodied agent system of any one of Examples 89 to 95 is disclosed, wherein the one or more processors are further configured to control the moveable portion to move based on the determined gaze direction.

In Example 97, the vehicle embodied agent system of any one of Examples 89 to 95 is disclosed, wherein the one or more processors are further configured to control the moveable portion to move based on the upper extremity position.

In Example 98, the vehicle embodied agent system of any one of Examples 89 to 97 is disclosed, wherein the one or more processors are further configured to control the moveable portion to move based on both the determined gaze direction and the determined upper extremity position.

In Example 99, the vehicle embodied agent system of any one of Examples 89 to 98 is disclosed, wherein the one or more processors are further configured to control the moveable portion to move based on a movement of the occupant.

In Example 100, the vehicle embodied agent system of any one of Examples 89 to 99 is disclosed, wherein the physical embodiment of the intelligent agent is a robot.

In Example 101, the vehicle embodied agent system of any one of Examples 89 to 100 is disclosed, wherein the physical embodiment of the intelligent agent comprises a mechanical likeness of a human being.

In Example 102, the embodied agent system of any one of Examples 89 to 100 is disclosed, wherein executing a routine comprises moving a moveable portion such that the embodied agent's eyes are positioned to face a location on which an occupant's gaze is also directed.

In Example 103, the vehicle tag system of any one of Examples 1 through 17 is disclosed, wherein vehicle comprises a plurality of vehicle occupants.

In Example 104, the vehicle tag system of Example 103 is disclosed, wherein the one or more processors are further configured to identify the plurality of vehicle occupants in the one or more images; select one of the vehicle occupants according to a selection instruction; determine a gaze direction of the selected vehicle occupant from the one or more images; select a display location corresponding to the determined gaze direction; and control the image display device to display a tag at the display location.

In Example 105, the vehicle tag system of Example 103 is disclosed, wherein the one or more processors are further configured to identify the plurality of vehicle occupants in the one or more images; determine a gaze direction of each of plurality of vehicle occupants from the one or more mages;
select a display location corresponding to the determined gaze directions; and control the image display device to display a tag at the display location.

In Example 106, the vehicle tag system of Example 105 is disclosed, wherein the display location is selected based on at least one of gaze directions of the plurality of occupants, an angle of a surface of the display location relative to at least one of the plurality of occupants, a relative distortion of the tag for each of the plurality of occupants, or any combination thereof.

In Example 107, the vehicle tag system of any one of Examples 103 to 106 is disclosed, further comprising one or more sensors, configured to receive information of a vicinity of the vehicle; and wherein the one or more processors are further configured to select a point in the vicinity of the vehicle corresponding to a visual cue of the vehicle occupants.

In Example 108, the vehicle tag system of Example 107 is disclosed, wherein the visual cue is a gaze direction of the occupants.

In Example 109, the vehicle tag system of Example 107 or 108 is disclosed, wherein the visual cue is a direction of an upper extremity of the occupants, and wherein the one or more processors are further configured to detect from the one or more images an upper extremity of an occupant; and determine the visual cue according to a direction of the upper extremity.

In Example 110, the vehicle tag system of Example 109 is disclosed, further comprising selecting a point in the vicinity of the vehicle corresponding to both the gaze direction and the direction of the upper extremity.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A vehicle tag system comprising:
   one or more processors, configured to
      determine a gaze direction of a vehicle occupant from image sensor data representing one or more images of the vehicle occupant;
      select a display location corresponding to the determined gaze direction; and
      control an image display device to display a tag at the display location;
   the image display device, configured to display the tag at the selected display location according to the one or more processors.

2. The vehicle tag system of claim 1, wherein the one or more processors are configured to determine the gaze direction of the vehicle occupant from the one or more images by determining from the one or more images a head position and an eye position of the vehicle occupant.

3. The vehicle tag system of claim 1, wherein the one or more processors are configured to determine from the one or more images a head yaw and an eye yaw, and wherein determining gaze direction comprises combining the determined head yaw and eye yaw.

4. The vehicle tag system of claim 1, wherein the image display device is a projector, wherein controlling the image display device to display the tag comprises controlling the projector to project the tag onto the selected display location.

5. The vehicle tag system of claim 1, wherein the image display device is a display, and wherein controlling the display to display the tag at the selected display location comprises determining a location on the display that corresponds to the determined gaze direction and controlling the display to display the tag at the determined location.

6. The vehicle tag system of claim 1, wherein the tag is an embodied agent and/or a physical representation of an artificial intelligence.

7. The vehicle tag system of claim 1, further comprising one or more sensors, configured to receive information of a vicinity of the vehicle; and wherein the one or more processors are further configured to select a point in the vicinity of the vehicle corresponding to a visual cue of the vehicle occupant.

8. The vehicle tag system of claim 7, wherein the visual cue is a gaze direction of the occupant or wherein the visual cue is a direction of an upper extremity of occupant, and wherein the one or more processors are further configured to:
    detect from the one or more images an upper extremity of an occupant; and
    determine the visual cue according to a direction of the upper extremity.

9. The vehicle tag system of claim 1, wherein the vehicle comprises a plurality of occupants, and wherein the one or more processors are further configured to:
    identify the plurality of vehicle occupants in the one or more images;
    determine a gaze direction of each of plurality of vehicle occupants from the one or more images;
    select a display location corresponding to the determined gaze directions; and
    control the image display device to display a tag at the display location.

10. The vehicle tag system of claim 9, wherein the display location is selected based on at least one of gaze directions of the plurality of occupants, an angle of a surface of the display location relative to at least one of the plurality of occupants, a relative distortion of the tag for each of the plurality of occupants, or any combination thereof.

11. A vehicle embodied agent system comprising:
    a physical embodied agent;
    one or more image sensors, configured to receive one or more images of vehicle occupant; and
    one or more processors, configured to:
    determine a gaze direction of the vehicle occupant from the one or more images; and
    control the physical embodied agent to execute a routine according to the determined gaze direction.

12. The vehicle embodied agent system of claim 11, wherein the one or more processors are configured to determine the gaze direction of the vehicle occupant from the one or more images by determining from the one or more images a head position and an eye position of the vehicle occupant.

13. The vehicle embodied agent system of claim 11, wherein the one or more processors are configured to determine from the one or more images a head yaw and an eye yaw, and wherein determining gaze direction comprises combining the determined head yaw and eye yaw.

14. The vehicle embodied agent system of claim 11, wherein the one or more processors are configured to determine the gaze direction of the vehicle occupant by determining from the one or more images a head position and an eye position of the vehicle occupant.

15. The vehicle embodied agent system of claim 11, wherein the physical embodied agent is configured with a moveable portion comprising at least one of a moveable head; moveable eyes; a moveable torso; one or more moveable appendages; or any combination thereof.

16. The vehicle embodied agent system of claim 15, wherein executing a routine comprises moving a moveable portion.

17. The vehicle embodied agent system of claim 15, wherein executing a routine comprises moving a moveable portion such that the embodied agent's eyes are positioned to face the occupant.

18. A method of displaying a tag comprising:
    receiving one or more images of vehicle occupant;
    determining a gaze direction of the vehicle occupant from the one or more images;
    selecting a display location or locations corresponding to the determined or potential gaze direction; and
    controlling an image display device to display a tag at the display location.

19. The method of displaying a tag of claim 18, wherein determining the gaze direction of the vehicle occupant from the one or more images comprises determining from the one or more images a head position and an eye position of the vehicle occupant.

20. The vehicle tag system of claim 1, wherein the tag is an embodied agent, an avatar, or a physical representation of an artificial intelligence.

* * * * *